(12) United States Patent
Takaishi

(10) Patent No.: US 6,956,712 B2
(45) Date of Patent: Oct. 18, 2005

(54) HEAD POSITION DEMODULATING METHOD AND DISK APPARATUS

(75) Inventor: Kazuhiko Takaishi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/795,749

(22) Filed: Mar. 8, 2004

(65) Prior Publication Data

US 2004/0264033 A1 Dec. 30, 2004

(30) Foreign Application Priority Data

Jun. 30, 2003 (JP) .................................... 2003-187286

(51) Int. Cl.$^7$ .............................................. G11B 5/596
(52) U.S. Cl. .............................. 360/77.08; 360/77.04; 360/29
(58) Field of Search ....................... 360/77.08, 77.04, 360/49, 29, 67, 65, 77.02, 46, 77.05, 75, 78.14, 78.04

(56) References Cited

U.S. PATENT DOCUMENTS 5,822,144 A * 10/1998 Takahashi ................. 360/67
5,867,341 A    2/1999 Volz et al. ............... 360/77.08
6,091,567 A * 7/2000 Cooper et al. ........... 360/77.08
6,369,974 B1   4/2002 Asgari et al. ............ 360/78.14

FOREIGN PATENT DOCUMENTS

EP     785 542     7/1997
JP     8-195044    7/1996

\* cited by examiner

*Primary Examiner*—David Hudspeth
*Assistant Examiner*—Jason Olson
(74) *Attorney, Agent, or Firm*—Greer, Burns & Crain, Ltd.

(57) ABSTRACT

A head position is demodulated by two-phase servo signals of PosN and PosQ from output of the head, so as to acquire a more accurate demodulated position. Saturation of PosN and PosQ is judged from the ratio of each absolute value of PosN and PosQ, and a different demodulating method is used for a saturated area and for an unsaturated area, and a demodulating formula is constructed so that the edge of each demodulating area matches with the edge of the adjacent demodulating area. Also saturated/unsaturated is judged by comparing the absolute value of PosN and the absolute value of PosQ, and determining whether the ratio thereof is greater or small than a predetermined saturation coefficient r.

20 Claims, 21 Drawing Sheets

FIG. 10

| BLOCK | PosN | PosQ | Track%2 | \|N\|>=\|Q\| | \|N\|<=r | \|Q\|<=r | CALCULATION FORMULA |
|---|---|---|---|---|---|---|---|
| 1 | − | − | 0 | 1 | x | 1 | Track−Q1−0.5 |
| 1 | − | − | 0 | 1 | x | 0 | Track−Q2−0.5 |
| 2 | − | − | 0 | 0 | 0 | x | Track+N2 |
| 2 | − | − | 0 | 0 | 1 | x | Track+N1 |
| 3 | + | − | 0 | 0 | 1 | x | Track+N1 |
| 3 | + | − | 0 | 0 | 0 | x | Track+N2 |
| 4 | + | − | 0 | 1 | x | 0 | Track+Q2+0.5 |
| 4 | + | − | 0 | 1 | x | 1 | Track+Q1+0.5 |
| 5 | + | + | 1 | 1 | x | 1 | Track+Q1−0.5 |
| 5 | + | + | 1 | 1 | x | 0 | Track+Q2−0.5 |
| 6 | + | + | 1 | 0 | 0 | x | Track−N2 |
| 6 | + | + | 1 | 0 | 1 | x | Track−N1 |
| 7 | − | + | 1 | 0 | 1 | x | Track−N1 |
| 7 | − | + | 1 | 0 | 0 | x | Track−N2 |
| 8 | − | + | 1 | 1 | x | 0 | Track−Q2+0.5 |
| 8 | − | + | 1 | 1 | x | 1 | Track−Q1+0.5 |

| BLOCK | PosN | PosQ | Track%2 | \|N\|>=\|Q\| | \|N\|<=r | \|Q\|<=r | CALCULATION FORMULA |
|---|---|---|---|---|---|---|---|
| 1 | − | − | 1 | 1 | x | 1 | Track−Q1−0.5+1 |
| 1 | − | − | 1 | 1 | x | 0 | Track−Q2−0.5+1 |
| 2 | − | − | 1 | 0 | 0 | x | Track+N2+1 |
| 2 | − | − | 1 | 0 | 1 | x | Track+N1+1 |
| 3 | + | − | 1 | 0 | 1 | x | Track+N1−1 |
| 3 | + | − | 1 | 0 | 0 | x | Track+N2−1 |
| 4 | + | − | 1 | 1 | x | 0 | Track+Q2+0.5−1 |
| 4 | + | − | 1 | 1 | x | 1 | Track+Q1+0.5−1 |
| 5 | + | + | 0 | 1 | x | 1 | Track+Q1−0.5+1 |
| 5 | + | + | 0 | 1 | x | 0 | Track+Q2−0.5+1 |
| 6 | + | + | 0 | 0 | 0 | x | Track−N2+1 |
| 6 | + | + | 0 | 0 | 1 | x | Track−N1+1 |
| 7 | − | + | 0 | 0 | 1 | x | Track−N1−1 |
| 7 | − | + | 0 | 0 | 0 | x | Track−N2−1 |
| 8 | − | + | 0 | 1 | x | 0 | Track−Q2+0.5−1 |
| 8 | − | + | 0 | 1 | x | 1 | Track−Q1+0.5−1 |

64

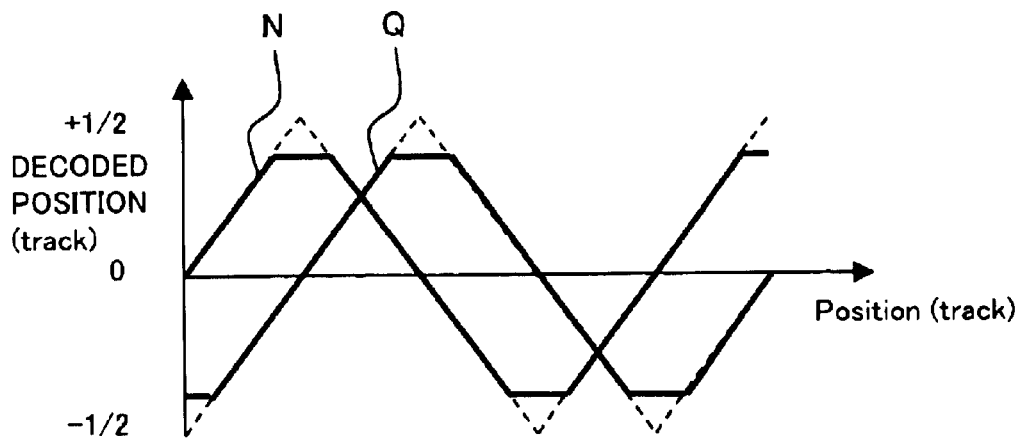
FIG. 28 (A) PRIOR ART
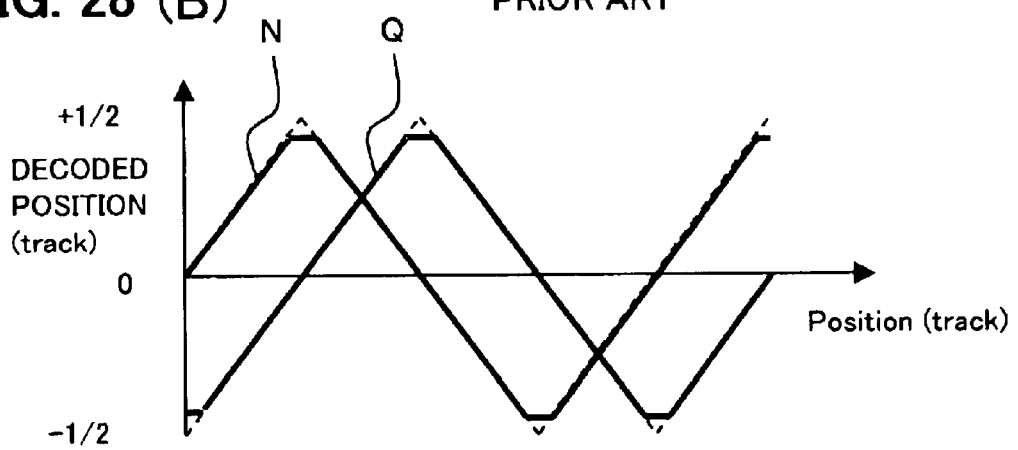
FIG. 28 (B) PRIOR ART
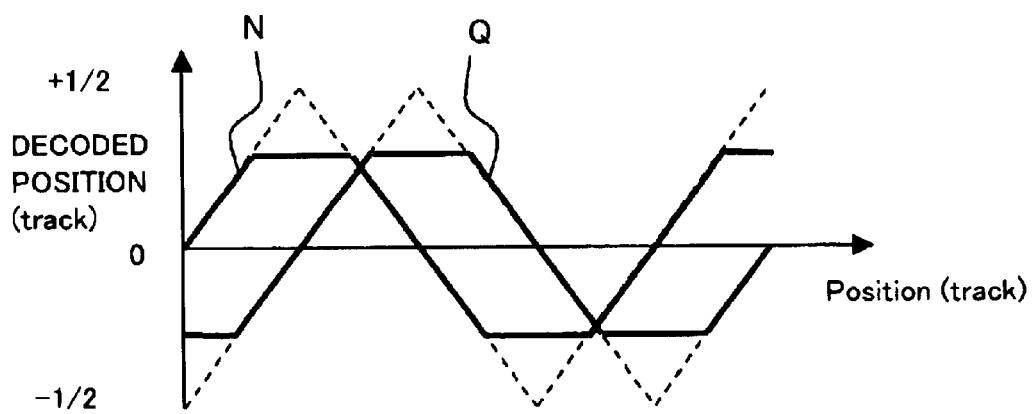
FIG. 28 (C) PRIOR ART

HEAD POSITION DEMODULATING METHOD AND DISK APPARATUS

CROSS-REFERENCE TO RELATED APPLICATIONS

This application is based upon and claims the benefit of priority from the prior Japanese Patent Application No. 2003-187286, filed on Jun. 30, 2003, the entire contents of which are incorporated herein by reference.

BACKGROUND OF THE INVENTION

1. Field of the Invention

The present invention relates to a head position demodulating method and disk apparatus for demodulating the head position by servo signals recorded on a disk, and more particularly to a head position demodulating method and disk apparatus for decreasing demodulated position errors due to the read characteristics of the head.

2. Description of the Related Art

A disk storage apparatus for recording and reproducing data on a rotating disk medium is widely used as a data storage apparatus. As FIG. 23 shows, the disk apparatus is comprised of a disk 94 for storing data, a spindle motor 96 for rotating the disk 94, a head 90 for recording and reproducing information on the disk 94, and an actuator 92 for moving the head 90 to the target position. Typical examples of this apparatus are a magnetic disk apparatus (HDD: Hard Disk Drive) and an optical disk apparatus (DVD-ROM, MO).

As FIG. 24 shows, on a magnetic disk apparatus, a plurality of position signals 100 for detecting the position of the head 90 are recorded in the arc position with respect to the rotation center 98 on the disk 94, and constitute a track. The position signal 100 is comprised of a servo mark, track number and offset information (servo information). The current position of the head 90 can be detected by using the track number and the offset information.

The difference between this position information and the target position is determined, drive amount is calculated according to the displacement amount (difference), and the drive amount for driving the actuator 92 is supplied, that is, current, in the case of a VCM (Voice Coil Motor) and voltage, in the case of an electro-strictive actuator, is supplied.

The servo signal (position signal) 100 on the disk 94 is either recorded by the disk apparatus itself, that is by the STW (Servo Track Write) method, or recorded by an external STW apparatus.

For this position signal, an area demodulating method using two-phase servo signals PosN and PosQ is used. FIG. 25 is a diagram depicting positional demodulating by the two-phase servo signals, and FIG. 26 is a diagram depicting two-phase servo signals thereof.

As FIG. 25 shows, the position signal (servo pattern) is comprised of four offset signals (servo bursts) A–D of which the phase is shifted from one another. In FIG. 25, the servo bursts A and B are recorded symmetrically with respect to the track position (dotted line position), and servo bursts C and D are recorded symmetrically with respect to the track boundary (solid line position).

From the output PosA–PosD when the head reads the servo bursts A–D, the two-phase servo signals PosN and PosQ are calculated by the following formula.

$$PosN = PosA - PosB$$
$$PosQ = PosC - PosD$$

or $$PosN = (PosA - PosB)/(PosA + PosB)$$
$$PosQ = (PosC - PosD)/(PosC + PosD)$$

As the detailed enlarged view in FIG. 26 shows, the signal of PosQ is placed with a ¼ track phase shift compared with PosN.

The demodulated position Pos is demodulated using either the absolute position of PosN or PosQ, whichever is smaller. In other words, as FIG. 25 shows, the acquired PosN or PosQ, of which the absolute value is smaller, indicated by the bold line in FIG. 25, is selected.

In this way, the amplitude of the reading output of each offset signal (PosA–PosD) from the head 90 is in proportion to the area of the offset signal (PosA–PosD) at the position of the head 90. In other words, the servo signal allows demodulating the position of the head by demodulating the area indicated by the amplitude.

By connecting the selected signals of the two-phase servo signals of the area demodulating method, the demodulated position of the actual position is acquired. The switching of PosN and PosQ occurs at this connection. It is preferable that the connected demodulated positions are a straight line, even with this switching.

As FIG. 27 shows, the causes of inhibiting the generation of a straight line are as follows; first cause is the deviation of the gain for converting the detected PosN and PosQ in track units (called position sensitivity). This gain changes depending on the detection sensitivity of the head, and if deviation occurs, the demodulated positions become different on the boundary between the section for demodulating PosN and the section for demodulating PosQ, where a step difference occurs.

Second cause is the fluctuation of the recording positions of the servo bursts A–D due to unstable writing during servo signal recording, and this is called RRO (Repeatable Run Out).

Third cause is that the read core width of the head is smaller than the track width, so PosN and PosQ are saturated by the head output, and by this a step difference occurs at the connected section.

To solve the problem of RRO and the problem of the measurement error of position sensitivity, the following methods are proposed.

(1) If the absolute value is $|N|<|Q|$, the position is demodulated by $\pm N/2\,(|N|+|Q|)$, and if not, the position is demodulated by $\pm Q/2(|N|+|Q|)$ (U.S. Pat. No. 5,867,341, Official Gazette, "Disk drive system using multiple pairs of embedded servo bursts" (e.g. FIG. 6)).

(2) If the absolute value is $|N|<|Q|$, the position is demodulated by $\pm N/4|Q|$, otherwise the position is demodulated by $\pm Q/4|N|$ (U.S. Pat. No. 6,369,974, Official Gazette, "Disk drive with method of constructing a continuous position signal and constrained method of linearizing such a position signal while maintaining continuity" (FIG. 9, FIG. 10)).

(3) If the absolute value is $|N|<|Q|$, the position is demodulated by $\pm N/\sqrt{(|N|^2+|Q|^2)}$, and if not, the position is demodulated by $\pm Q/\sqrt{(|N|^2+|Q|^2)}$ (Japanese Patent Application Laid-Open No. H9-198817, "Magnetic disk apparatus").

All of these methods have a feature that (1) if PosN and PosQ are "0", then the demodulated position is also 0, and (2), the boundary of the demodulated area of the PosN and PosQ has the same value for both cases of demodulating by PosN and demodulating by PosQ.

As the above formula shows, these methods need not measure position sensitivity, so the influence of a measurement error of position sensitivity can be avoided. Even if the write positions of the servo bursts of PosN and PosQ shift due to the influence of the write accuracy of the servo signals, a displacement does not occur at the boundary of the demodulated blocks of PosN and PosQ.

The demodulating formulas for PosN and PosQ are created such that the values match with the adjacent demodulation formula at the edge of the respective demodulated section. For example, when |N| and |Q| are the same in the method of U.S. Pat. No. 5,867,341, Official Gazette, "Disk drive system using multiple pairs of embedded servo bursts", the values of the two formulas both become $\pm\frac{1}{4}$, which match each other.

These prior arts assume that the saturation of the signals PosN and PosQ, described in FIG. 27, is constant, and in the denominator of one signal, the signal component of the other signal is integrated, and by this, the step difference at switching is solved.

However, with the current demand for increased storage capacity, the track pitch must be narrower. Because of this, the read core width of the head decreases, which makes it difficult to manufacturer a head (especially an MR head) with a uniform detection characteristic. So the saturation width and the saturation area of PosN and PosQ, which are obtained by detecting the servo bursts, as shown in FIG. 28 (A), (B) and (C), change, depending on the detection performance of the read element.

Therefore in prior art, a deviation of the demodulated position tends to occur because of the change of the saturation width, since the change of the saturation width is not considered, even if the problems of position sensitivity and RRO are solved. In particular, this interferes with the improvement of positioning accuracy, which is currently demanded due to the decrease in track pitch.

SUMMARY OF THE INVENTION

With the foregoing in view, it is an object of the present invention to provide a head position demodulating method and a disk apparatus for decreasing the influence of saturation of the position signals due to the detection performance of the head, and demodulating an accurate head position.

It is another object of the present invention to provide a head position demodulating method and a disk apparatus for decreasing the influence of position sensitivity, RRO and saturation of position signals, and demodulating an accurate head position.

It is still another object of the present invention to provide a head position demodulating method and a disk apparatus for using the demodulating formula for detecting a saturated area from position signals, and decreasing the influence of saturation.

To achieve these objects, the present invention is a head position demodulating method for demodulating a position of a head by acquiring two-phase servo signals of PosN and PosQ from servo information recorded on a disk, including a step of judging a saturated area and an unsaturated area of the PosN or PosQ from the ratio of the absolute value of the PosN and the absolute value of the PosQ, a first step of calculating a demodulated position by a first demodulating formula where the PosN and PosQ are combined in the saturated area, and a second step of calculating a demodulated position by a second demodulating formula where the PosN and PosQ are combined in the unsaturated area.

the disk apparatus of the present invention includes a head for reading information from a disk on which servo information is recorded, an actuator for positioning the head to a predetermined position on the disk, and a control unit for acquiring two-phase servo signals of PosN and PosQ from the servo information read by the head, demodulating the position of the head, and controlling the actuator. And the control unit judges a saturated area and an unsaturated area of the PosN or the PosQ from the ratio of the absolute value of the PosN and the absolute value of the PosQ, calculates a demodulated position by a first demodulating formula where the PosN and PosQ are combined in the saturated area, and calculates a demodulated position by a second demodulating formula where the PosN and PosQ are combined in the unsaturated area.

In the demodulating method of the present invention, it is judged whether the section is saturated by the ratio of the respective absolute values of PosN and PosQ, and a different demodulating method is used for a saturated section and for an unsaturated section, so an optimum formula can be selected depending on whether the section is saturated, and a more accurate position demodulating is possible compared with a conventional method which does not consider saturation at all.

It is preferable that the present invention further includes a step of comparing the absolute value of the PosN and the absolute value of the PosQ, and a step of selecting one of the first and second steps according to the comparison result and the judgment result. By this, a position demodulating can be easily implemented.

In the present invention, it is preferable that the first and second demodulating formulas are constructed so that the demodulated position by the first demodulating formula and by the second demodulating formula match at a demodulating boundary between the saturated area and the unsaturated area. By this, the generation of a step difference at the demodulating boundary can be prevented.

In the present invention, it is preferable that the judgment step includes a step of judging as saturated when the ratio of the absolute value of the PosN and the absolute value of the PosQ is a predetermined ratio or less, and judging as unsaturated when the ratio exceeds the predetermined ratio.

From this aspect, the absolute value of PosN and the absolute value of PosQ are compared, and saturated/unsaturated is judged depending on whether the ratio is greater or smaller than a predetermined saturation coefficient r, so it is unnecessary to measure the position sensitivity in advance, and saturation can be correctly judged even if it is unknown as to how many tracks the detected PosN and PosQ actually correspond to.

It is preferable that the present invention further includes a step of selecting the predetermined ratio corresponding to a selected head out of a plurality of heads. By this, saturation can be judged according to the characteristics of the head.

In the present invention, it is preferable that the first step includes a step of demodulating with the first demodulating formula constructed by a combination of PosN, PosQ and the ratio. By this, a step difference at the demodulating boundary can be prevented, and a more accurate position demodulating becomes possible.

In the present invention, it is preferable that the first step includes a step of demodulating with the first demodulating formula, where the smaller absolute value of the absolute value of the PosN and the absolute value of the PosQ is included in the numerator, and the greater absolute value and the predetermined ratio are included in the denominator, and the second step includes a step of demodulating with the second demodulation formula, where the smaller absolute value of the absolute value of the PosN and the absolute value of the PosQ is included in the numerator, and the greater absolute value is included in the denominator. By this, the problem of saturation and step difference at the demodulating boundary can be solved.

In the present invention, it is preferable that the first demodulating formula of the first step is comprised of a demodulating formula where the PosN is included in the numerator, and the absolute value of the PosQ and double the predetermined ratio+1 are included in the denominator when the absolute value of the PosN is the absolute value of the PosQ or less, and a demodulating formula where PosQ is included in the numerator and the absolute value of the PosN and double the predetermined ratio+1 are included in the denominator when the absolute value of the PosN exceeds the absolute value of the PosQ.

In the present invention, it is preferable that the second demodulating formula of the second step is comprised of a demodulating formula where the PosN is included in the numerator, and double the result of adding the absolute value of the PosN and the absolute value of the PosQ is included in the denominator when the absolute value of the PosN is the absolute value of the PosQ or less, and a demodulating formula where the PosQ is included in the numerator, and double the result of adding the absolute value of the PosN and the absolute value of the PosQ is included in the denominator when the absolute value of the PosN exceeds the absolute value of the PosQ.

It is also preferable that the present invention further comprises a step of measuring the predetermined ratio from the value of PosQ when the head is positioned at a predetermined track position and the value of PosQ when the head is positioned at a position which is ¼ track away from above mentioned the track position.

BRIEF DESCRIPTION OF THE DRAWINGS

FIG. 10 is a calculation table when the track number is normal in FIG. 9;

FIG. 11 is a calculation table when the track number is abnormal in FIG. 9;

FIGS. 28(A), (B) and (C) are characteristic diagrams of the two-phase servo signal of the head.

DESCRIPTION OF THE PREFERRED EMBODIMENTS

Embodiments of the present invention will now be described in the sequence of disk storage apparatus, position demodulating method, examples, parameter measurement processing and other embodiments, but the present invention is not limited to the following embodiments.

[Disk Storage Apparatus]

Figure 1:
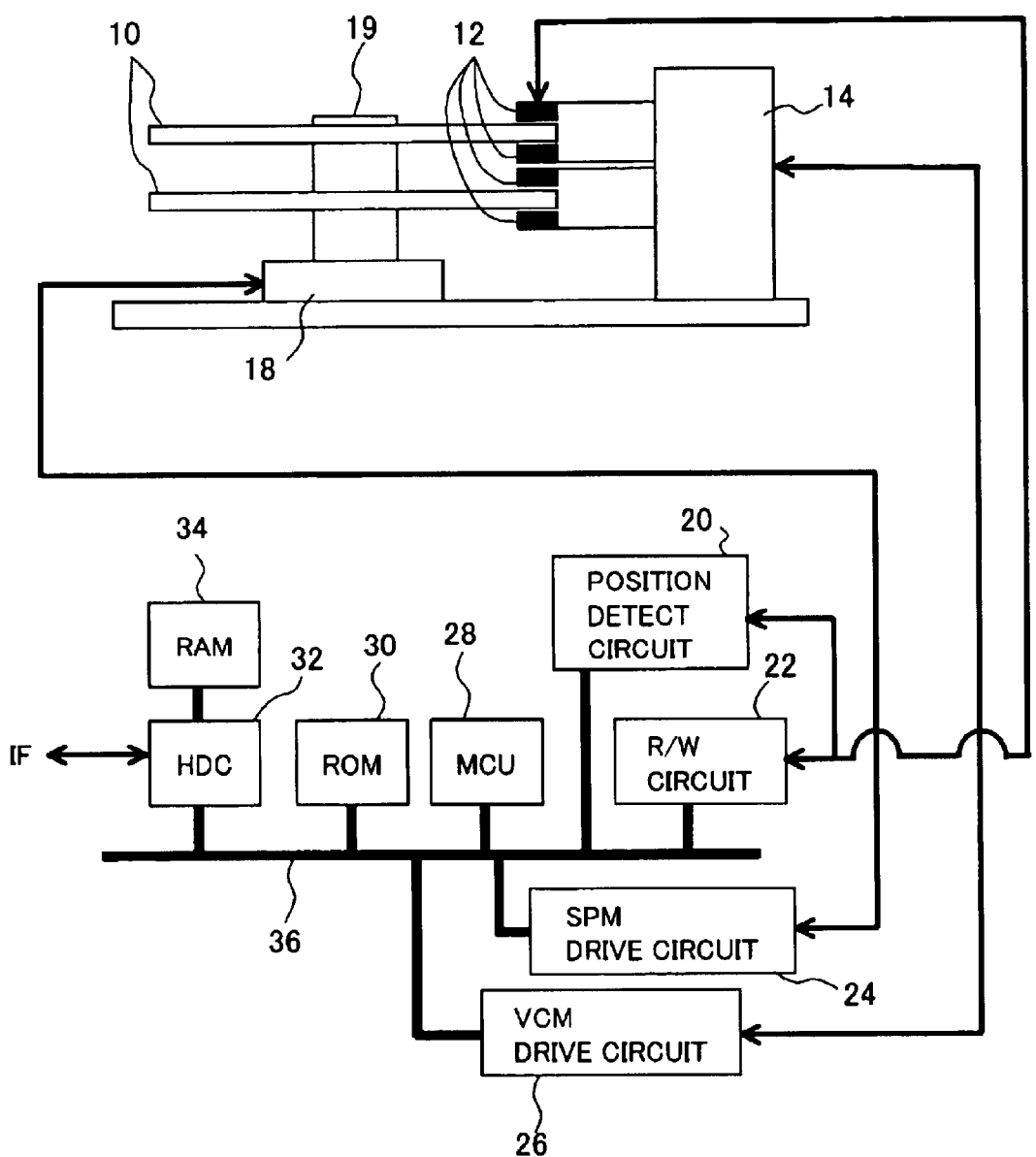
FIGS. 1 is a diagram depicting the configuration of the disk storage apparatus according to an embodiment of the present invention.
Figure 2:
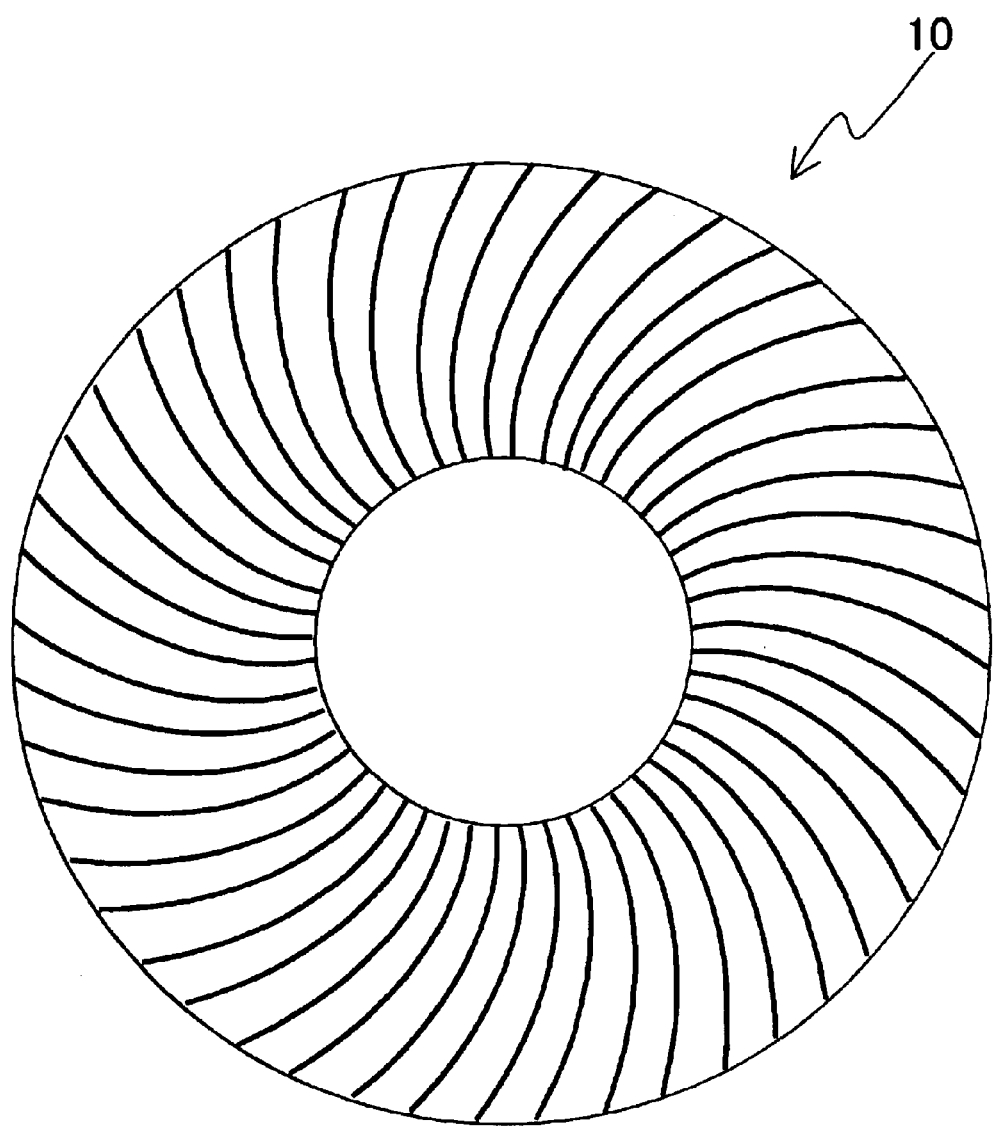
FIG. 2 is a diagram depicting the position signals of the disk in FIG. 1.
Figure 3:
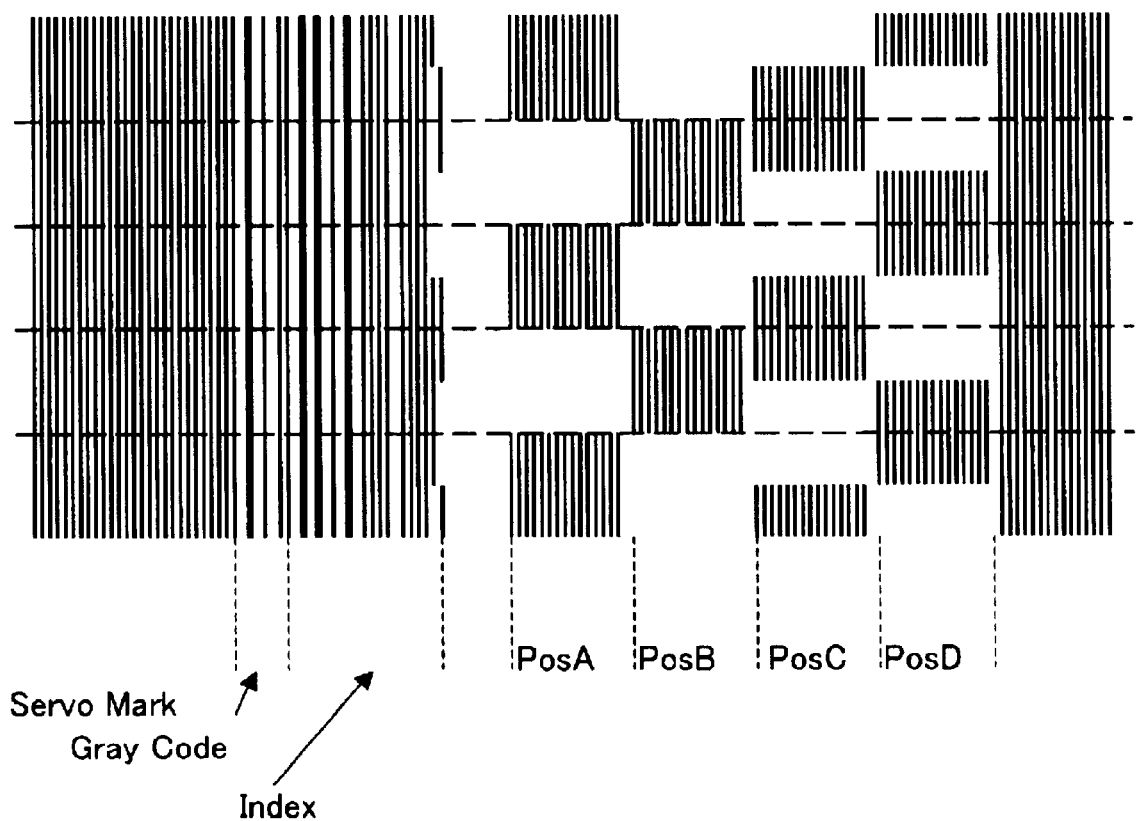
FIG. 3 is a diagram depicting the detailed position signals in FIG. 2.
Figure 4:
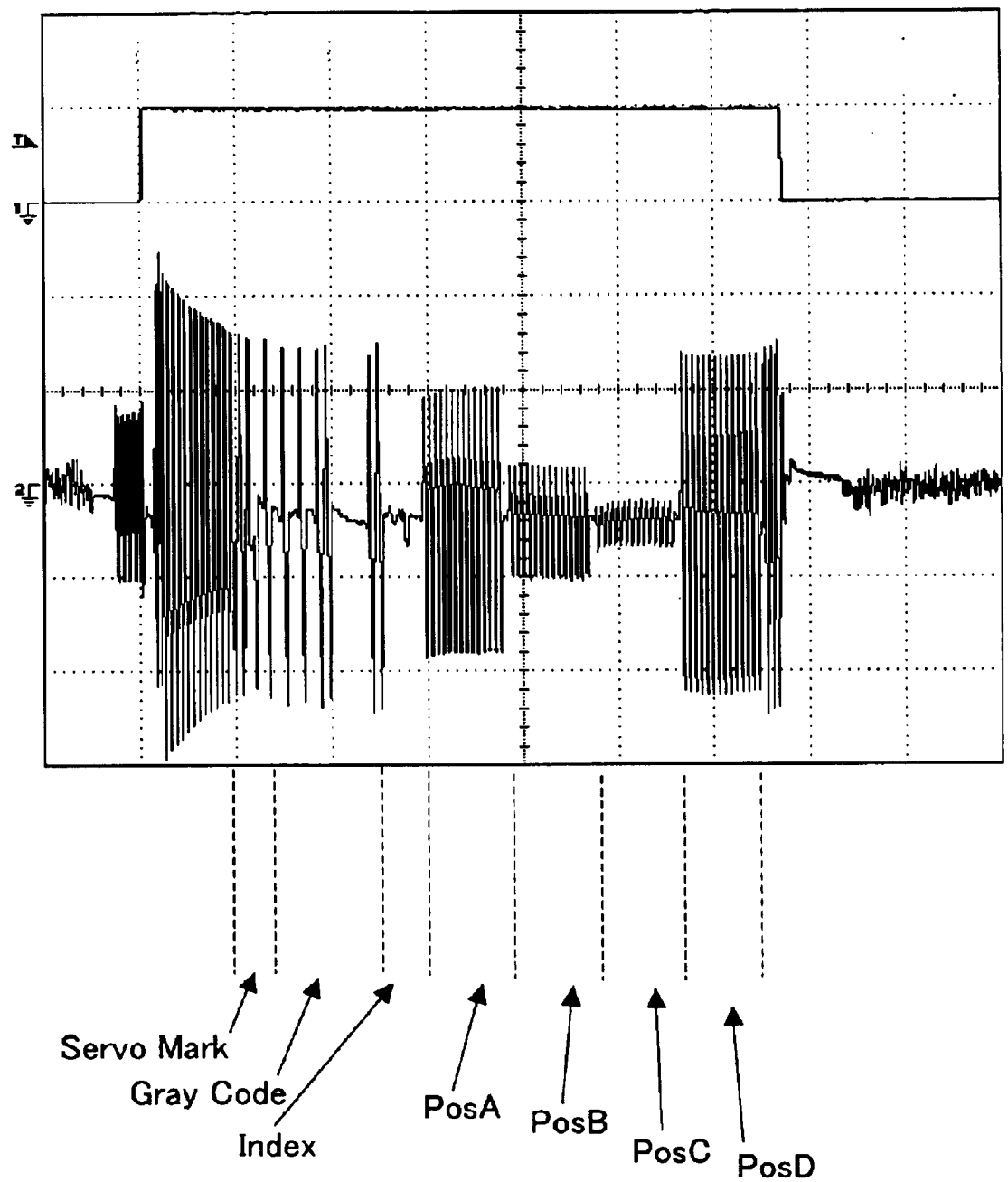
FIG. 4 is a read waveform diagram of the position signals in FIG. 2.
Figure 5:
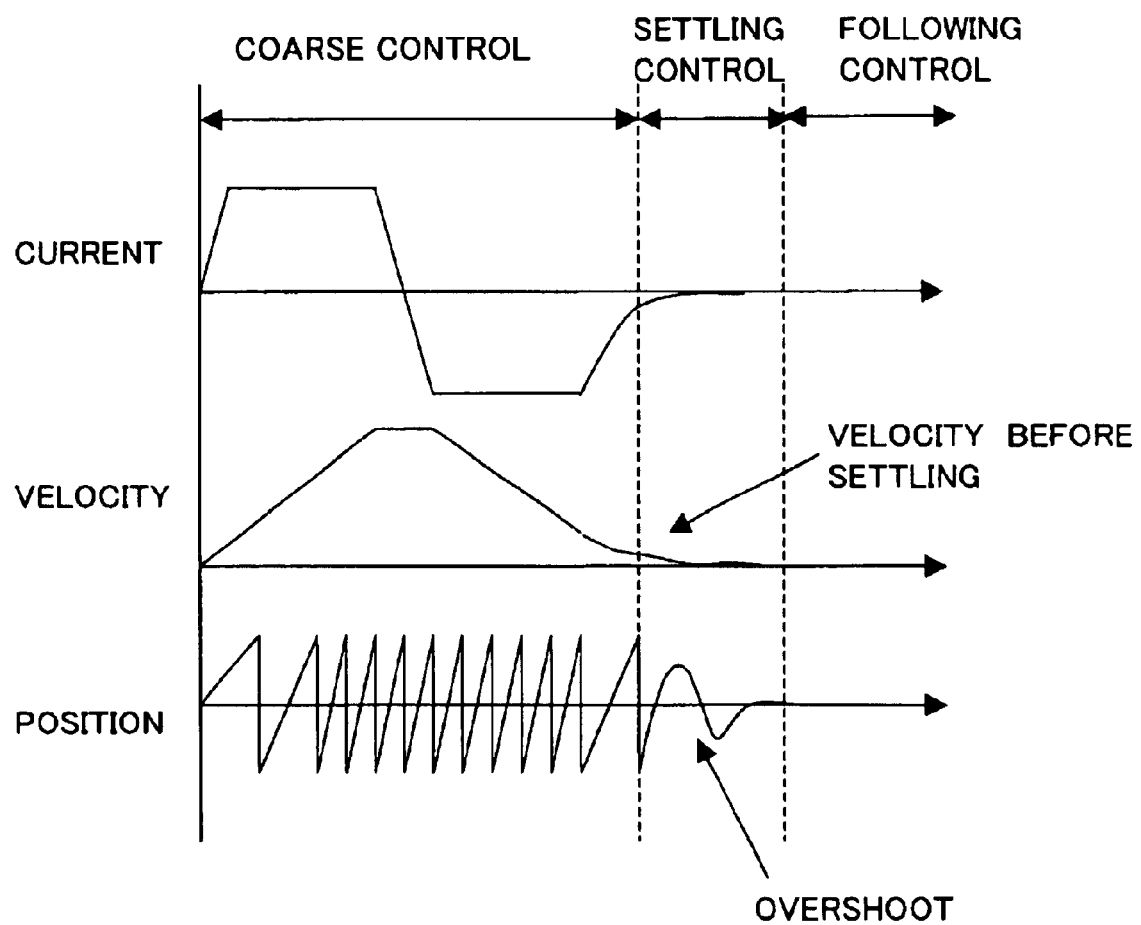
FIG. 5 is a diagram depicting the seek operation of the head in FIG. 1.
Figure 6:
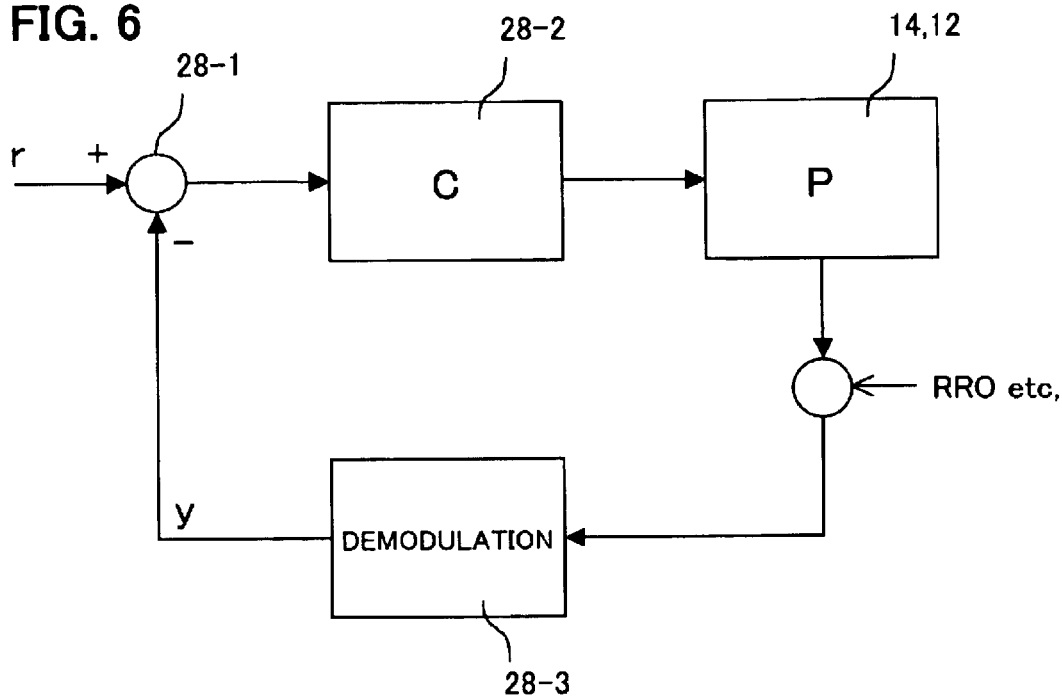
FIG. 6 is a diagram depicting the servo control system in FIG. 1.

FIG. 1 is a diagram depicting the configuration of the disk storage apparatus according to an embodiment of the present invention, FIG. 2 is a diagram depicting an arrangement of the position signals of the magnetic disk in FIG. 1, FIG. 3 is a diagram depicting the configuration of the position signals of the magnetic disk in FIG. 1 and FIG. 2, FIG. 4 is a read waveform diagram of the position signals in FIG. 3, FIG. 5 is a diagram depicting the head position control in FIG. 1, and FIG. 6 is a block diagram depicting the servo control system with the configuration in FIG. 1.

FIG. 1 shows a magnetic disk apparatus as a disk storage apparatus. As FIG. 1 shows, the magnetic disk 10, which is a magnetic storage medium, is set on the rotation axis 19 of the spindle motor 18. The spindle motor 18 rotates the magnetic disk 10. The actuator (VCM) 14 has a magnetic head 12 at the tip, and moves the magnetic head 12 in the radius direction of the magnetic disk 10.

The actuator 14 is comprised of a voice coil motor (VCM) which rotates with the rotation axis at the center. In FIG. 1, two magnetic disks 10 are set at the magnetic disk apparatus, and four magnetic heads 12 are simultaneously driven by a same actuator 14.

The magnetic head 12 is comprised of a read element and a write element. In the magnetic head 12, the read element including a magnetic resistance (MR) element are layered on the slider, and the write element including a write coil is layered thereon.

The position detection circuit 20 converts the position signals (analog signals) read by the magnetic head 12 into digital signals. The read/write (R/W) circuit 22 controls the read and write of the magnetic head 12. The spindle motor (SPM) drive circuit 24 drives the spindle motor 18. The voice coil motor (VCM) drive circuit 26 supplies drive current to the voice coil motor (VCM) 14 and drives the VCM 14.

The micro-controller (MCU) 28 detects (demodulates) the current position from the digital position signal from the position detection circuit 20, and computes the VCM drive command value according to the error between the detected current position and the target position. In other words, position demodulating and servo control are performed. The read only memory (ROM) 30 stores the control programs of the MCU 28. The hard disk controller (HDC) 32 judges a position on a track based on the sector number of the servo signal, and records/reproduces the data. The random access memory (RAM) 34 temporarily stores the read data and the write data. The HDC 32 communicates with the host via such an interface IF as ATA and SCSI. The bus 36 connects these components.

As FIG. 2 shows, on the magnetic disk 10, servo signals (position signals) are disposed at equal intervals in the circumference direction on each track from the outer track to the inner track. Each track is comprised of a plurality of sectors, and the solid line in FIG. 2 indicates the recording positions of the servo signals. As FIG. 3 shows, a position signal is comprised of a servo mark Servo Mark, track number Gray Code, index Index, and offset information (servo bursts) PosA, PosB, PosC and PosD. The dotted line in FIG. 3 shows the track center.

FIG. 4 is a signal waveform when the position signal in FIG. 3 is read by the head 12. Using the track number Gray Code and the offset information PosA, PosB, PosC and PosD of the signal waveform shown in FIG. 4, the position of the magnetic head in the radius direction is detected. Also based on the index signal Index, the position of the magnetic head in the circumference direction is known.

For example, the sector number when the index signal is detected is set to 0, and the sector number of each sector of the track is acquired by incrementing each time the servo signal is detected. The sector number of this servo signal becomes the reference when data is recorded and reproduced. There is one index signal on a track. A sector number can be used instead of an index signal.

FIG. 5 is an example of seek control of the actuator, which is performed by the MCU 28 in FIG. 1. Through the position detection circuit 20 in FIG. 1, the MCU 28 confirms the position of the actuator, executes servo calculation, and supplies an appropriate current to the VCM 14. FIG. 5 shows the transition of control from the seek start, for moving the head 12 from a certain track position to the target track position, current of the actuator 14, velocity of the actuator (head) and position of the actuator (head).

In other words, in seek control, the head can be moved to the target position by transiting as coarse control, settling control and following control. Coarse control is basically a velocity control, and settling control and following control are basically position control, and in either case, the current position of the head must be detected.

To confirm position in this way, servo signals are recorded on thee magnetic disk in advance as shown in FIG. 2 described above. In other words as FIG. 3 shows, the servo mark to indicate the start position of the servo signals, gray code to indicate a track number, index signal, and such signals as PosA–PosD to indicate offset, are recorded. These signals are read by the magnetic head, and the position detection circuit 20 converts these servo signals into digital values.

The MCU 28 performs the operations of the servo control system in FIG. 6. In other words, the error between the target position r and the current position y is computed by the computing block 28-1, the control amount is calculated by the control block 28-2, and the VCM 14, that is the plant, is driven. For the position of the plant, the position of the servo signal from the magnetic head 12 is demodulated by the demodulating block 28-3, and the current position y is acquired. At this time, the above mentioned position sensitivity, RRO and the influence of saturation enter into the servo control system.

[Position Demodulation Method]

Figure 7:
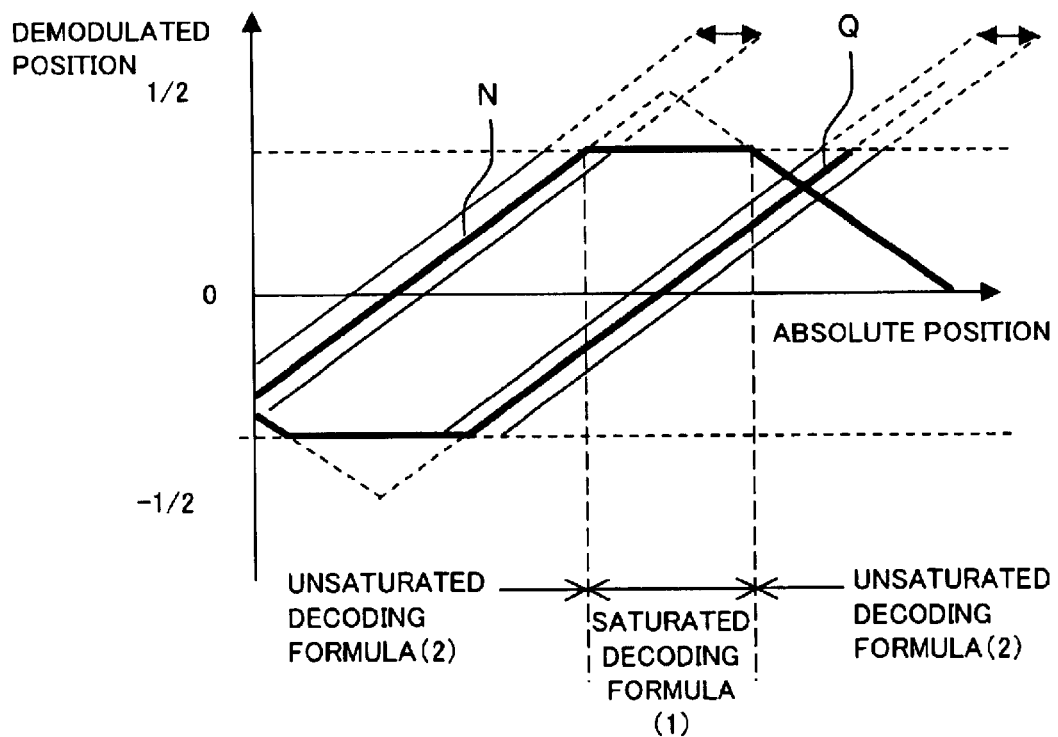
FIG. 7 is a diagram depicting the position demodulating method according to an embodiment of the present invention.
Figure 8:
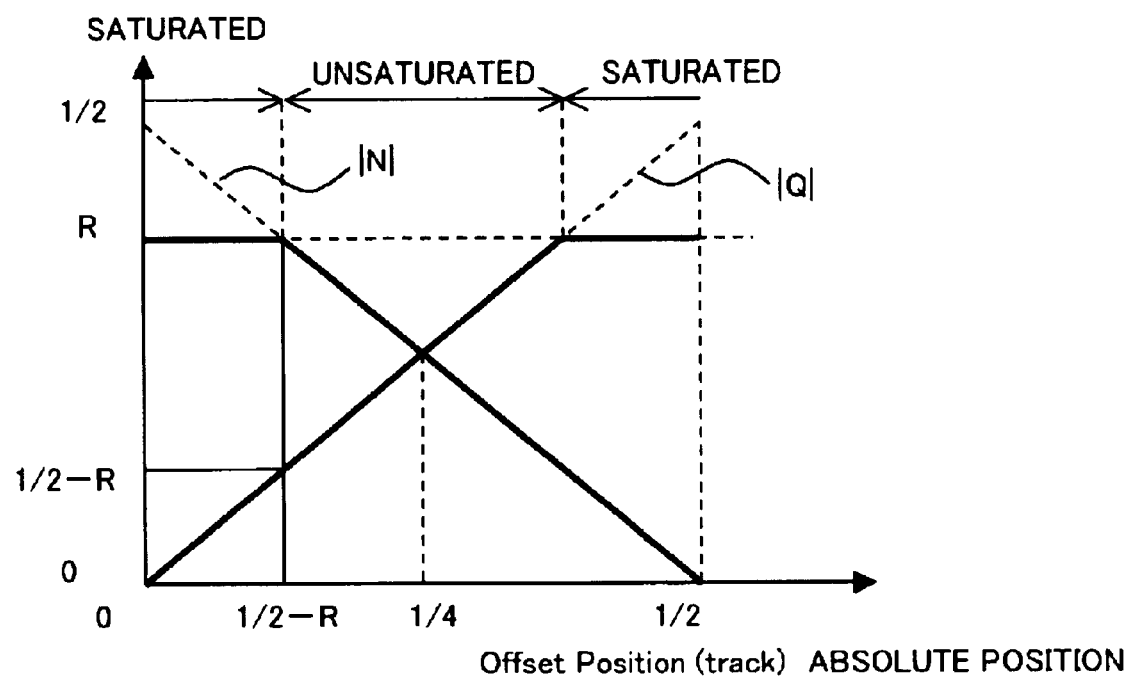
FIG. 8 is a diagram depicting the saturation coefficient in FIG. 7.

Now the principle of position demodulating of the present invention will be described. FIG. 7 is a diagram depicting the position demodulating of the present invention, and FIG. 8 is a diagram depicting the saturation judgment in FIG. 7.

In the present invention, whether PosN and PosQ are saturated is judged as the waveform diagram of the signals PosN and PosQ in FIG. 7 shows. To judge saturation it is judged whether the ratio of the respective absolute value of PosN and PosQ is greater or smaller than a proportional coefficient r, which depends on the track and the head.

And a different demodulating method is used for a saturated block and an unsaturated block. Also the demodulating formula is constructed such that the edge of each demodulated block matches with the edge of the adjacent demodulated block.

In other words, in the conventional method, the same demodulating formula is used, regardless saturated/unsaturated, as described above. Therefore various saturation widths cannot be supported, and the accuracy of a demodulated position decreases. Whereas in the present invention, an optimum formula is selected for each saturated block and unsaturated block, so demodulating can be more accurate than the conventional method which does not consider saturation at all.

For demodulating, the following logic in this embodiment is used.

When $|N| \leq |Q|$ if $|N| \leq r|Q|$ then $\pm N/(|Q|/(2(r+1)))$ (1)

if $|N| > r|Q|$ then $\pm N/((|N|+|Q|)*2)$ (2)

when $|N| > |Q|$ if $|Q| \leq r|N|$ then $\pm Q/(|N|*(2(r+1)))$ (3)

if $|Q| > r|N|$ then $\pm Q/(|N|+|Q|)*2)$ (4)

In other words, the absolute value |N| of PosN and the absolute value |Q| of PosQ are compared, and saturated/ unsaturated is judged depending on whether the ratio thereof is greater or smaller than a predetermined r. The ratio of PosN and PosQ is determined because this method does not measure the position sensitivity in advance, and because saturation is judged accurately in a state where it is unknown as to how many tracks the detected PosN and PosQ correspond to.

The reasons of deriving these demodulating formulas will be described, but here the method of calculating "r" in formulas (1)–(4) will be described. Here "r" is called a saturation coefficient. And "r" is determined as follows.

As FIG. 8 shows, it is assumed that the saturation amount of PosN or PosQ is converted into R tracks. Since PosN and PosQ are shifted ¼ track, the absolute positions thereof |N| and |Q| cross at the point of the ¼ track. At this time, the boundary position of the saturated block and the unsaturated block is (½−R).

If the ratio of |N| and |Q| at this position is r, then r is determined as follows.

1: r=R: (½−R)  (5)

r=(1−2R)/(2R)  (6)

R=½/(1+r)  (7)

For r or R, the number of saturated tracks R is determined first by the head output A at the position where PosN or PosQ is zero and the head output B at the position of |N|=|Q| (¼ track position) using R=A/4B, then "r" is determined by the formula (6).

Using r, which was determined in this way, a saturated area and an unsaturated area are judged by comparing |N| and |Q|, as described above. The unsaturated area is given by |N|>r |Q| in formula (2) or |Q|>r |N| in formula (4), so one of formula (2) and formula (4) is used. In other words,
±N/((|N|+|Q|)*2)
±Q/((|N|+|Q|)*2)

Sign "±" prefaces the above formulas because the inclination of the curve of PosN or PosQ can be both directions, positive and negative, with respect to the track direction. In other words, + or − is prefaced according to the condition to convert, so that the inclination becomes positive in the track increasing direction.

If the formula is constructed in this way, the values of the respective formula match at the boundary area of the demodulating blocks of PosN and PosQ. For example, when PosN and PosQ both have equal value V, the above two formulas both become ±e,fra /4+ee , where V is eliminated by the numerator and the denominator. Therefore at the boundary of the unsaturated area, the two formulas always result in the same value.

Next, the saturated area is given by |N|≦r |Q| in formula (1) or |Q|≦r |N| in formula (3), so one of formula (1) and formula (3) is used. In other words, one of
±N/(|Q|*(2(r+1)))
±Q/(|N|*(2(r+1)))
is used. "±" is also prefaced because the inclination of the curve of PosN or PosQ can be both directions, positive and negative, with respect to the track direction. + or − is prefaced according to the condition to convert so that the inclination becomes positive in the track increasing direction.

In the saturated area, one of PosN and PosQ always maintains a constant value. Therefore a value at the saturated side is used for the denominator. In FIG. 8, this is value R. Also a correction is performed so that the inclination of this formula becomes equal to "1" (linear characteristic). For this, R (=½/(1+r)) is multiplied since the denominator is R.

Now the boundary of two types of deciding formulas, formula (2) or formula (4) and formula (1) or formula (3) is considered. Based on the above mentioned demodulating logic, the boundary is when the ratio of the absolute values of PosN and PosQ is "r". For example, when demodulating is performed based on PosN, the boundary becomes as follows.

$$\pm N/(|N|+|Q|)*2 = \pm N/((|N|+(|N|r))*2)$$
$$= \pm r/((1+r)*2)$$
$$\pm N/|Q|*(2(r+1)) = \pm N/(|N|r*(2(r+1)))$$
$$= \pm r/((1+r)*2)$$

Therefore both formulas result in the same values. And this is the same for PosQ.

In this way, at the demodulating boundary, the calculation results do not deviate from that of the demodulating formula for the adjacent area. Therefore a step difference is not generated at the demodulating boundary.

Figure 9:
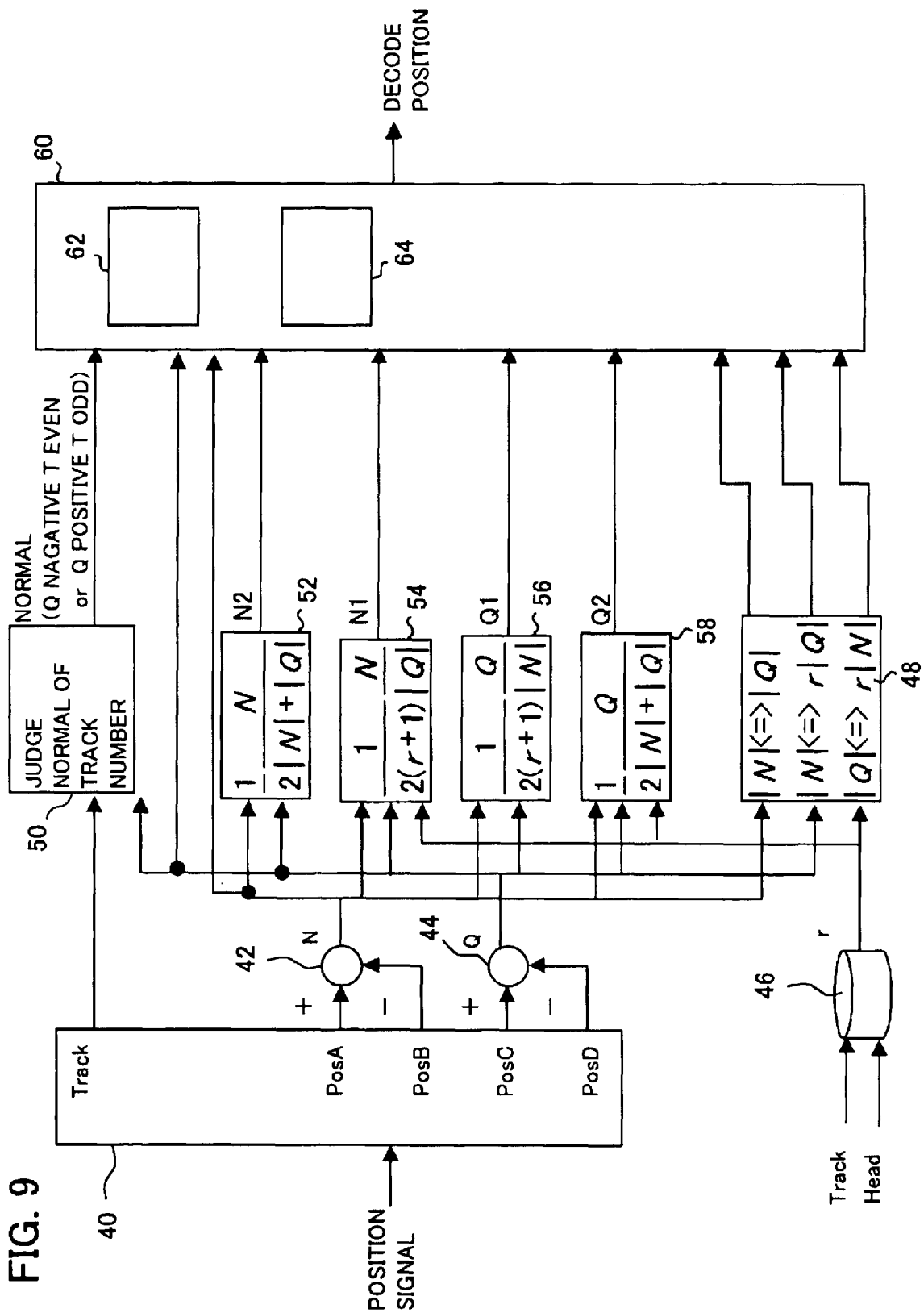
FIG. 9 is a functional block diagram depicting the embodiment of the position demodulating section of the head position control section in FIG. 1.
Figure 12:
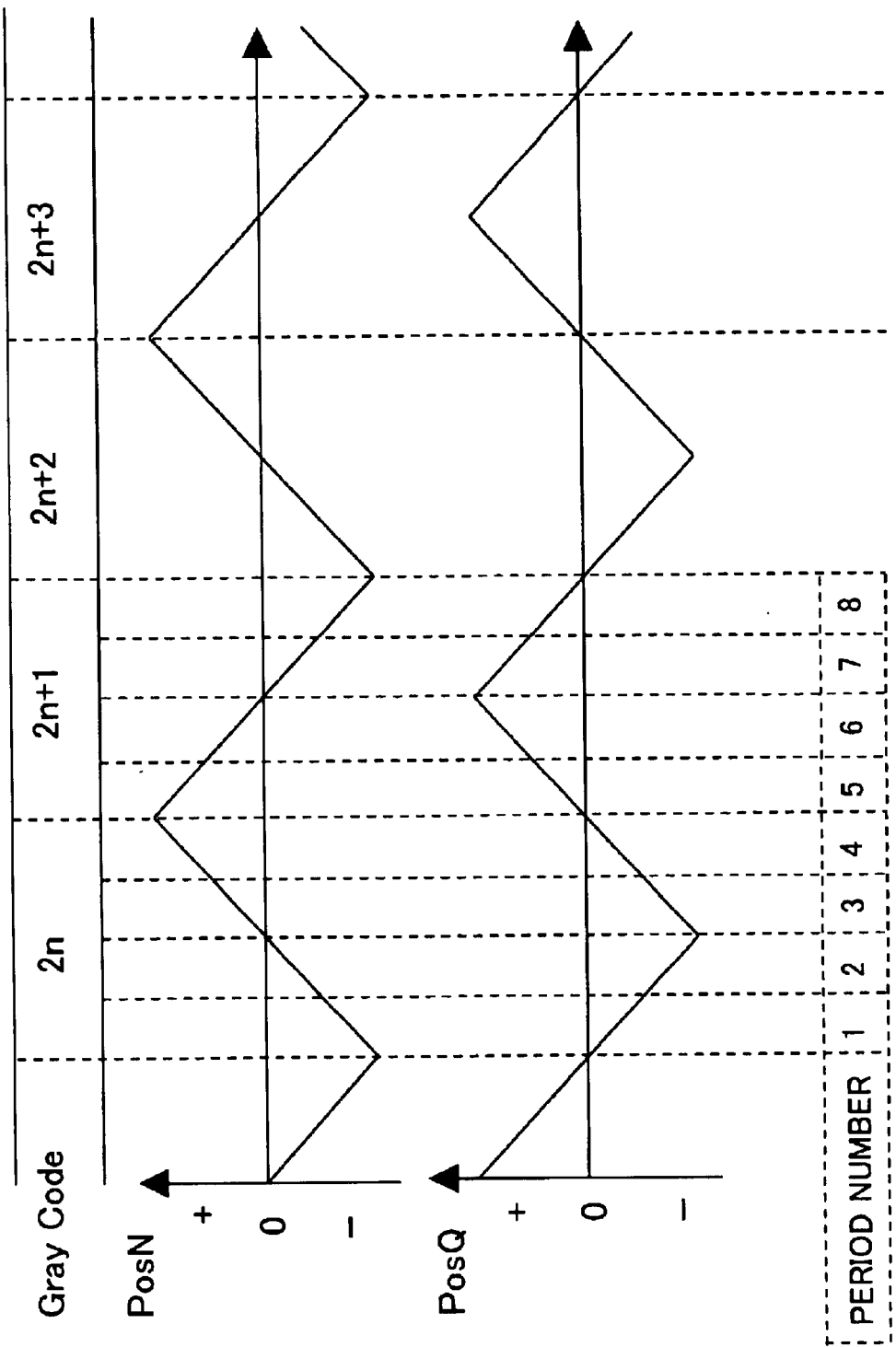
FIG. 12 is a diagram depicting the area division of the calculation tables in FIG. 10 and FIG. 11.

FIG. 9 is a block diagram depicting the position demodulating system according to an embodiment of the present invention, FIG. 10 and FIG. 11 are the calculation tables thereof, and FIG. 12 is a diagram describing the selection of the calculation table. The position demodulating system in FIG. 9 is executed by the MCU 28 in FIG. 1. The MCU 28 executes a known servo operation (e.g. observer control) using the demodulated position in FIG. 9 as the current position, and calculates the control amount of the VCM 14.

In FIG. 9, the signal demodulating section 40 separates the track number and the offset signals (PosA–PosD) from the position signal from the head 12 (see FIG. 4). The computing units 42 and 44 calculate the two-phase servo signals PosN and PosQ by the following computation respectively.

PosN=PosA−PosB  (8)

PosQ=PosC−PosD  (9)

The saturation coefficient table 46 stores the saturation coefficient r of each head and each zone. The saturation coefficient r is acquired by the measurement processing to be described in FIG. 22. The saturation coefficient table 46 is indexed by the track number and the head number demodulated by the signal demodulating section 40, and outputs the saturation coefficient r corresponding to the head and the zone.

The condition judgment section 48 judges the conditions of the above mentioned formulas (1)–(4). In other words, the values of |N| and |Q|, |N| and r|Q| and |Q| and r|N| are compared.

The track number normality judgment section 50 judges whether the track number is normally read. In other words, whether the head read the track number on the disk normally is judged since a read error may occur. As described in FIG. 3 and FIG. 7, PosQ is negative if the track number is an even number, and is positive if the track number is an odd number. Therefore the track number normality judgment section 50 receives the track number and the PosQ from the signal demodulating section 40, and judges that the track number is normal when the track number is an even number and PosQ is negative, or when the track number is an odd number and PosQ is positive, and otherwise judges as abnormal.

The four operation blocks 52, 54, 56 and 58 execute formula (2), formula (1), formula (3) and formula (4) respectively, and calculate N2, N1, Q1 and Q2 as follows.

$N2 = N/((|N|+|Q|)*2)$ $N1 = N/(|Q|*(2(r+1)))$ $Q2 = Q/((|N|+|Q|)*2)$ $Q1 = Q/(|N|*(2(r+1)))$

The demodulated position calculation section 60 has a demodulating calculation table 62 when the track number is normal, as shown in FIG. 10, and a demodulating calculation table 64 when the track number is abnormal, as shown in FIG. 11, selects one of these tables depending on the track normal/abnormal judgment output from the track number normality judgment section 50, and calculates the demodulated position.

In these tables 62 and 64 as in FIG. 12, one period of PosN and PosQ (that is for two tracks, 2n and 2n+1) is divided into 8, and the respective formula is set. In other words, as FIG. 10 and FIG. 11 shows, the formula of each block is selected based on the polarity of PosN and PosQ, remainder Track %2 when the track number is divided by 2, which indicates whether the track number is an odd or even number, value comparison of |N| and |Q|, |N| and r|Q|, and |Q| and r|N|, and the demodulated position is calculated.

For example, in the case of the calculation table 62 in FIG. 10 where the track number is normal, if the polarity of PosN and PosQ is "−", the track number is an even number (Track %2=0), and |N|≧|Q|("1") and |Q|≦r|N|("1"), then the area is a saturated area, so according to formula (3), the demodulated position is calculated by the formula for block 1=Track−Q1−0.5.

If the polarity of PosN and PosQ is "−", the track number is an even number (Track %2=±0), and |N|≧|Q|("1") and |Q| is not ≦r|N|("0"), then the area is an unsaturated area, so according to formula (4), the demodulated position is calculated by the other formula for block 1=Track−Q2−0.5. This is the same for blocks 2−8.

In the case of the calculation table 62 in FIG. 11 where the track number is abnormal, it is assumed that the track number is the track number of an adjacent area of the current demodulating area, and "1" or "−1" is added to the formula in FIG. 10.

For example, in FIG. 11, if the polarity of PosN and PosQ is "−", the track number is an odd number (Track %2=1), and |N|≧|Q|("1") and |Q|≦r|N|("1"), then this area is a saturated area, so according to formula (3), the demodulated position is calculated by the formula for block 1=Track−Q1−0.5+1.

If the polarity of PosN and PosQ is "−", the track number is an odd number (Track %2=1), and |N|≧|Q|("1") and |Q| is not ≦r|N|("0"), then this area is an unsaturated area, so according to formula (4), the demodulated position is calculated by the other formula for block 1=Track−Q2−0.5+1. This is the same for the blocks 2−8.

Also it is possible to compress the logic for demodulating the position by integrating the tables 62 and 64.

In this way, according to the position demodulating method of the present invention:, saturation is judged by the ratio of the respective absolute values of PosN and PosQ, and a different demodulating method is used for the saturated block and the unsaturated block. The demodulating formula is constructed such that the edge of each demodulating block matches with the edge of the adjacent demodulating block.

Since an optimum formula is selected depending on saturated/unsaturated, a more accurate demodulating is possible compared with a conventional method which does not consider saturation at all.

Also the absolute value of PosN and the absolute value of PosQ are compared, and saturated/unsaturated is judged by whether the ratio thereof is greater or smaller than a predetermined saturation coefficient r, so it is unnecessary to measure the position sensitivity in advance, and saturation can be judged accurately even if it is unknown as to how many tracks the detected PosN and PosQ actually correspond to.

In the saturated area, the value at the saturated side is used for the denominator, since one of PosN and PosQ always maintains a constant value, and R (=1/(2*(1+r))) is multiplied so that the inclination of this formula becomes equal to 1. Therefore at the demodulation boundary, the calculation results do not deviate from that of the demodulating formula for the adjacent area. Therefore a step difference is not generated at the demodulating boundary.

An example when the above demodulation logic is written by an actual C language program will be shown below.

```
//A, B, C, D are the demodulated values of burst
//
N=(A−B);
Q=(C−D);
AbsN=N; if (AbsN < 0) AbsN=−AbsN;
AbsQ=Q; if (AbsQ < 0) AbsQ=−AbsQ;
//smaller absolute value of N and Q is used for demodulating
if (AbsN < = AbsQ) [
    //CASE: Demodulating PosN
    if (AbsN < = r*AbsQ)  PosTemp = N/AbsQ/(2*(1+r));
    else                  PosTemp = N/(AbsN+AbsQ)/2;
    PosOfs = 0;
    if (Q < = 0)[
        if ((Track & 1) = = 1)[
            if (N < = 0)   PosOfs += +1;
            else           PosOfs += −1;
        ]
    ]else[
        PosTemp = −PosTemp;
        if ((Track & 1) = = 0)[
            if (N < = 0)   PosOfs += −1;
            else           PosOfs += +1;
        ]
    ]
] else [
    //CASE: Demodulating PosQ
    if (AbsQ < = r*AbsN)  PosTemp = Q/AbsN/(2*(1+r));
    else                  PosTemp = Q/(AbsN+AbsQ)/2;
    if (N < = 0)[
        PosTemp = −PosTemp;
        if (Q < = 0)[
            PosOfs = −1/2;
            if ((Track & 1)= = 1) PosOfs += +1;
        ]else[
            PosOfs = +1/2;
            if ((Track & 1) = = 0) PosOfs += −1;
        ]
    ]else[
        PosTemp = +PosTemp;
        if (Q < = 0) [
            PosOfs = +1/2;
            if ((Track & 1) = = 1) PosOfs += −1;
        ]else[
            PosOfs = −1/2;
            if ((Track & 1) = = 0) PosOfs += +1;
        ]
    ]
]
Position = Track + PosTemp + PosOfs;
```

EXAMPLES

Figure 13:
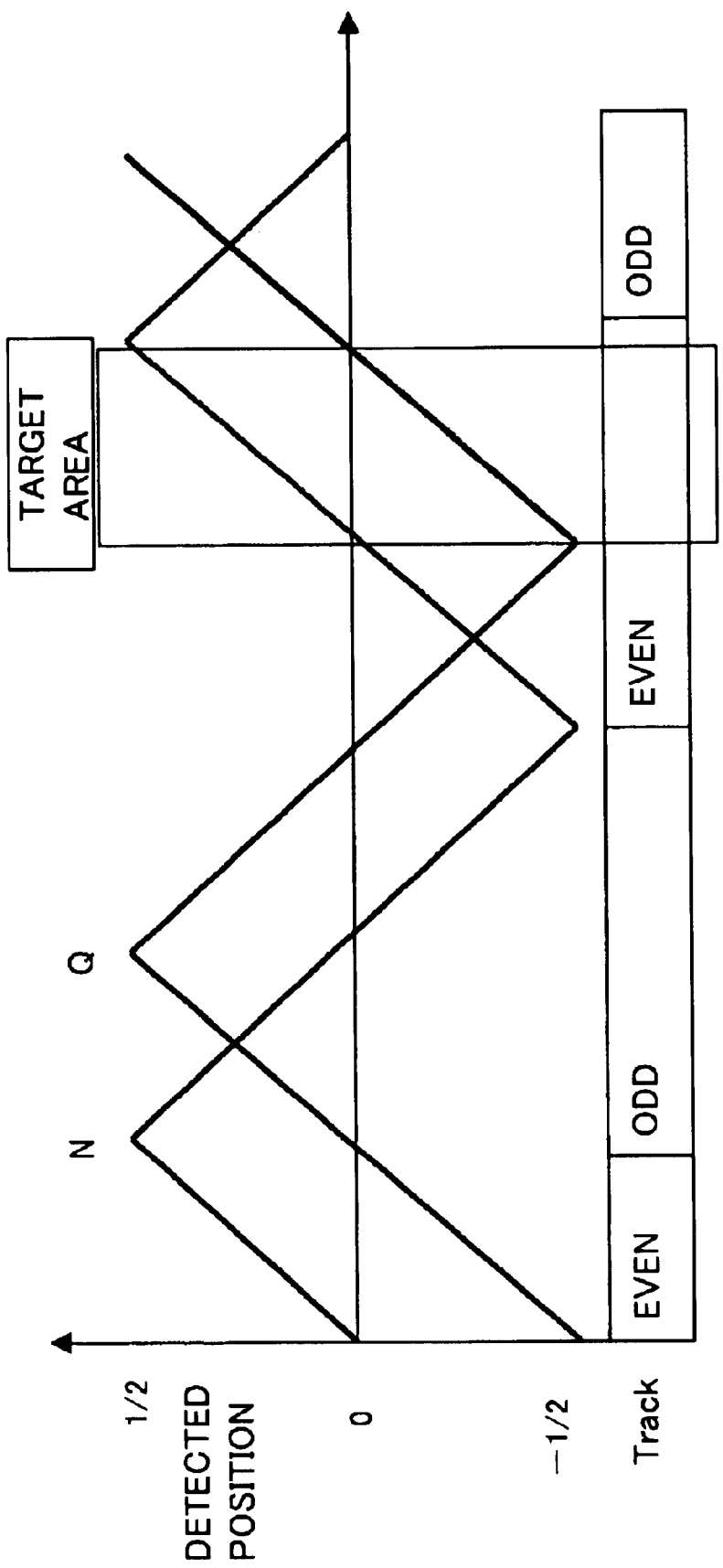
FIG. 13 is a diagram depicting the simulation target area of the present embodiment.
Figure 14:
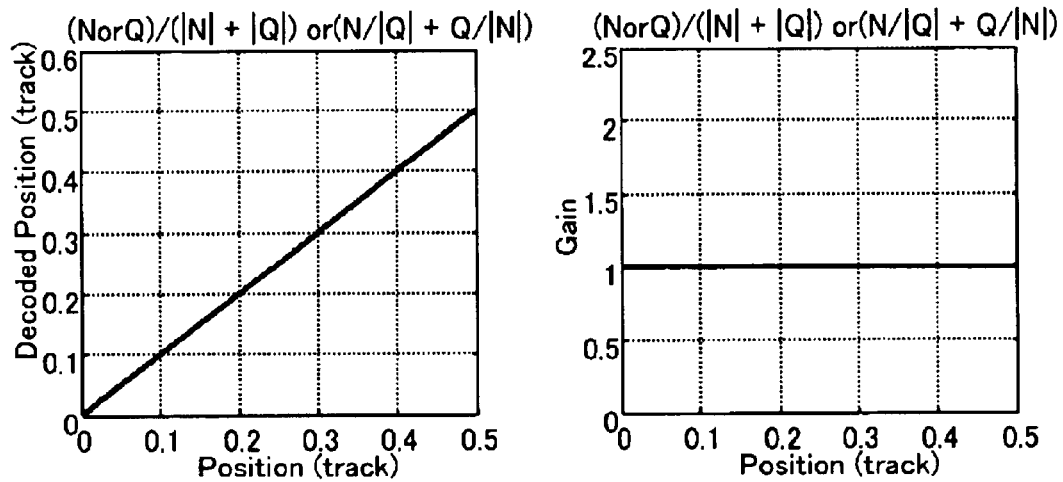
FIG. 14 are characteristic diagrams of the first simulation result according to the present invention.
Figure 15:
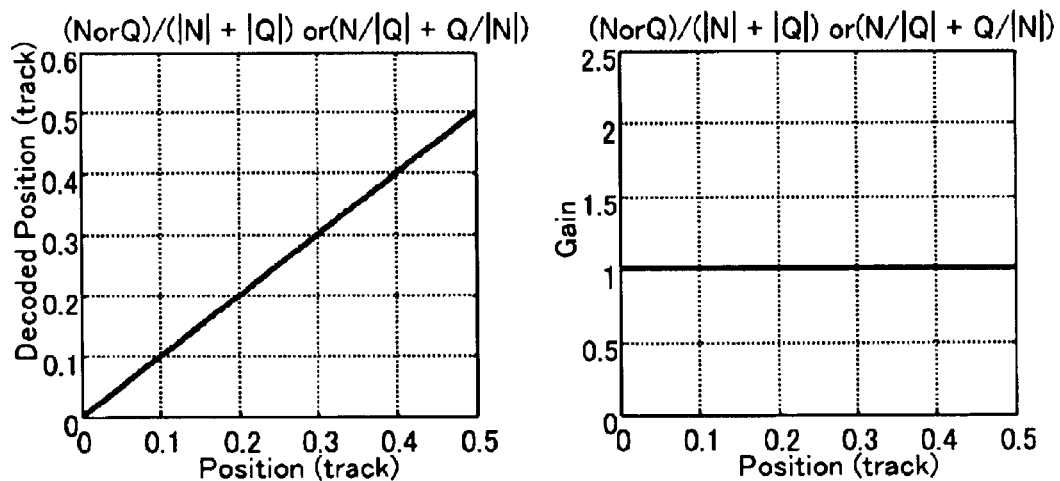
FIG. 15 are characteristic diagrams of the second simulation result according to the present invention.
Figure 16:
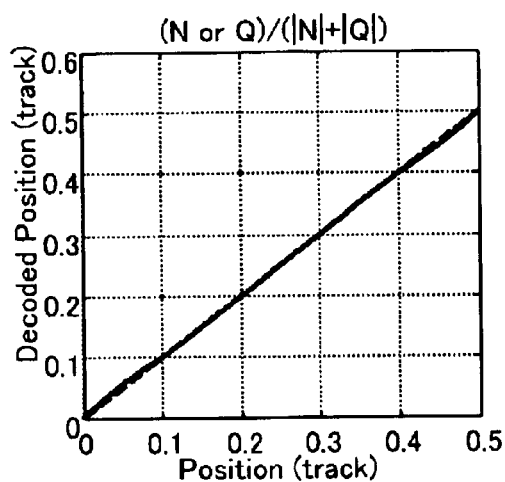
FIG. 16 are characteristic diagrams of the first simulation result according to the first prior art as a comparison example.
Figure 16:
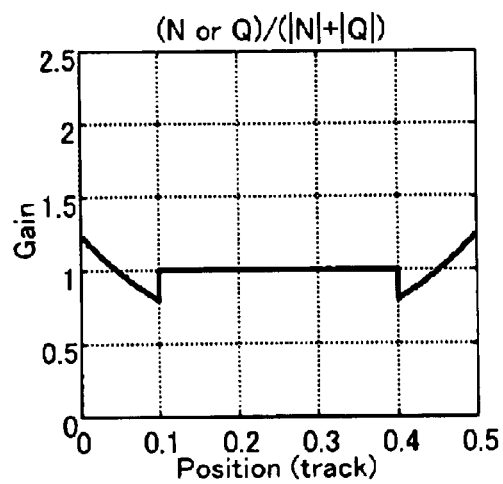
Figure 17:
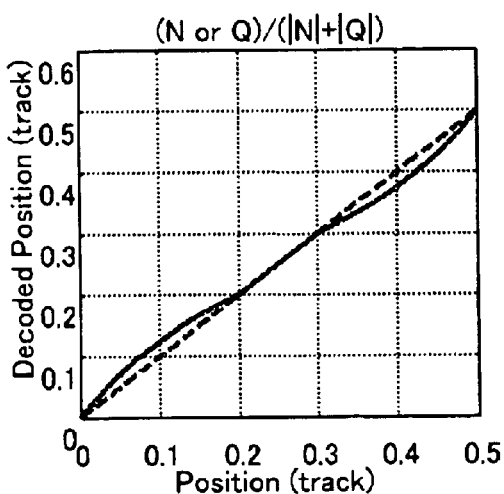
FIG. 17 are characteristic diagrams of the second simulation result according to the first prior art, as a comparison example.
Figure 17:
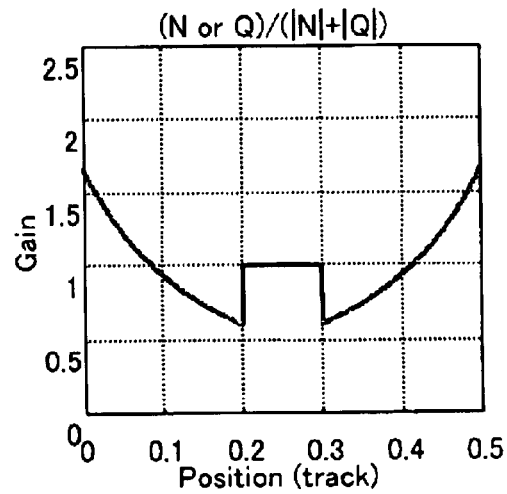
Figure 18:
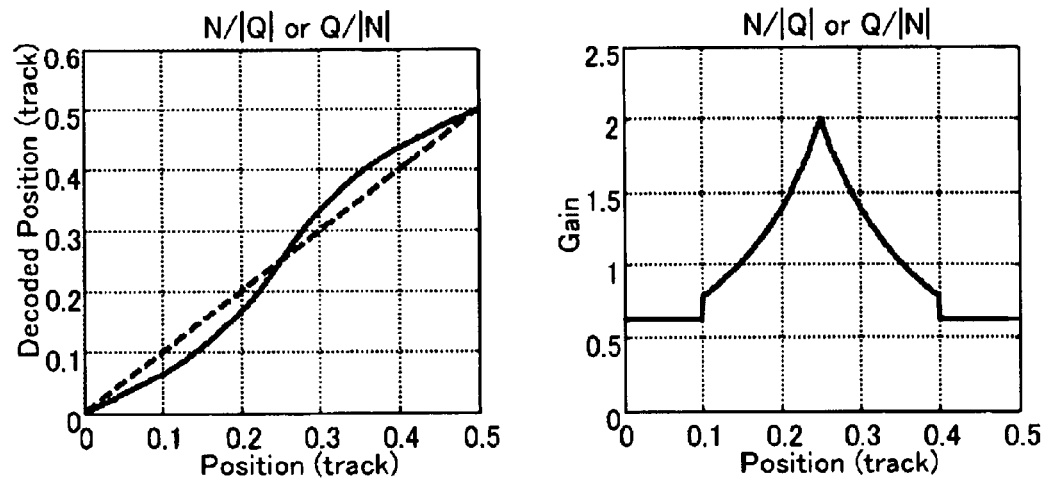
FIG. 18 are characteristic diagrams of the first simulation result according to the second prior art as a comparison example.
Figure 19:
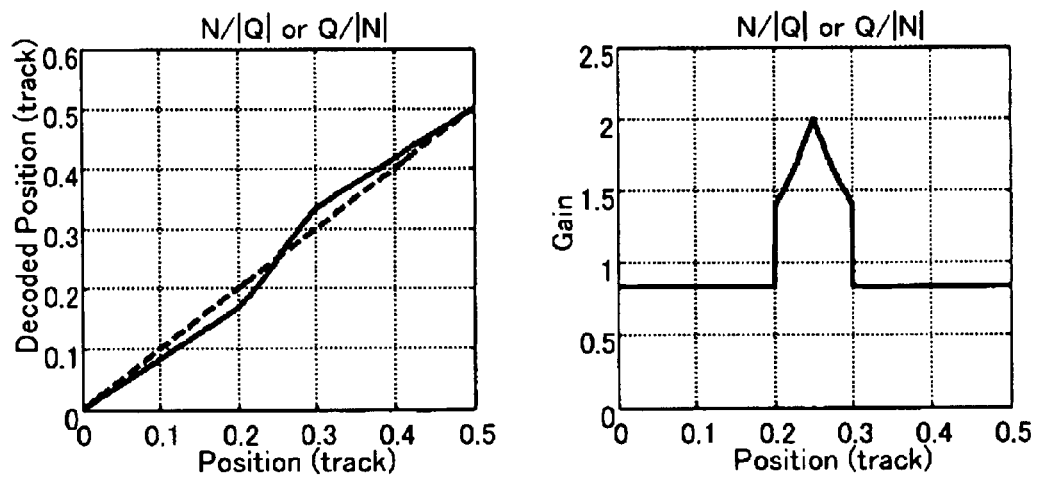
FIG. 19 are characteristic diagrams of the second simulation result according to the second prior art as a comparison example.
Figure 20:
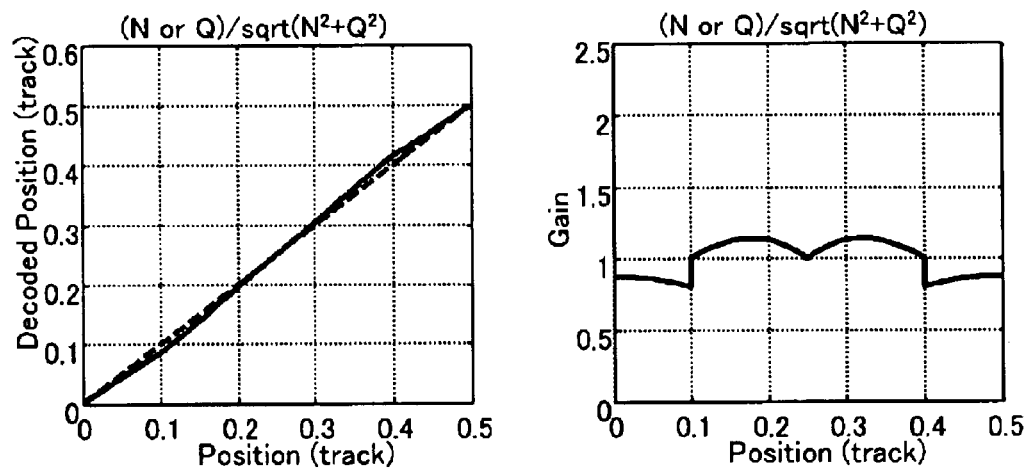
FIG. 20 are characteristic diagrams of the first simulation result according to the third prior art as a comparison example.
Figure 21:
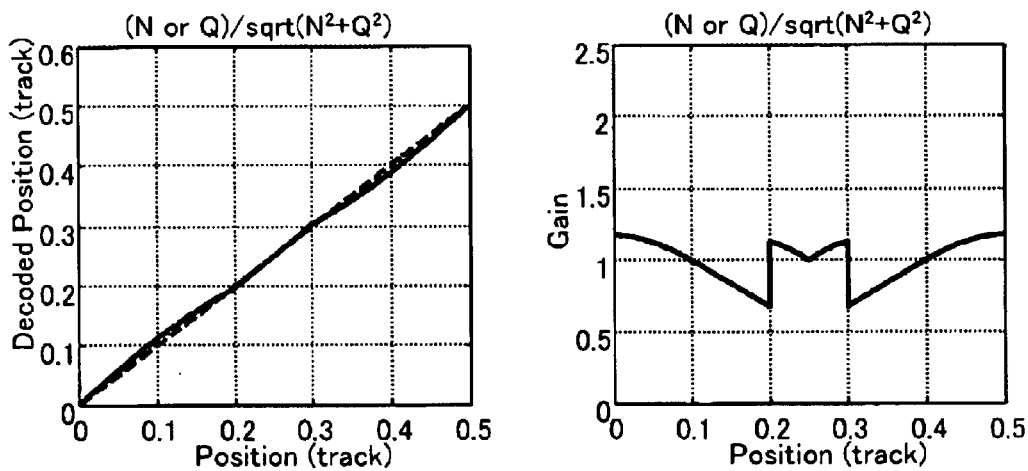
FIG. 21 are characteristic diagrams of the second simulation result according to the third prior art as a comparison example.

As an example of the present invention, simulation results will now be described. FIG. 13 is a diagram depicting the target area of the simulation of demodulating performance, FIG. 14 and FIG. 15 are diagrams showing the simulation result by the present invention, FIG. 16 and FIG. 17 are diagrams showing the simulation result by the demodulating formula of prior art in U.S. Pat. No. 5,867,341, Official Gazette, "Disk drive system using multiple pairs of embedded servo bursts", FIG. 18 and FIG. 19 are diagrams showing the simulation result by the demodulating formula of prior art in U.S. Pat. No. 6,369,974, Official Gazette, "Disk drive with method of constructing a continuous position signal and constrained method of linearizing such a position signal while maintaining continuity", and FIG. 20 and FIG. 21 are diagrams showing the simulation result by the demodulating formula of prior art in Japanese Patent Application Laid-Open No. H9-198817, "Magnetic disk apparatus".

The calculation method for simulation will be described. At first, the saturation amount (number of tracks) of PosN and PosQ and the size of RRO are given in track units. Then regarding the area in FIG. 13 as the calculation range (range of 0.5 track width with a certain track as a reference), the absolute position is divided into small equal scales (0.0001 tracks). Considering the saturation amount and RRO for each of the scales, the signals of PosN and PosQ are calculated in track units.

Using each demodulating formula, the values of the demodulated position is calculated. Here it is assumed that a track number read error does not occur. Then the curve of absolute position vs. demodulated position is shown. Also the value when the differential value of the demodulated positions of adjacent scale points is divided by the unit scale width, is determined for each point, and this value is regarded as the gain. Also the curve of the absolute position vs. gain is shown.

FIG. 14 and FIG. 15 are the simulation results of the demodulating method by the present invention (absolute position vs. demodulated position characteristics and absolute position vs. gain characteristics), where FIG. 14 is a result when RRO is zero and saturation is 0.4 track, and FIG. 15 is a result when RRO is zero and saturation is 0.3 track. As FIG. 14 and FIG. 15 show, the demodulating formula is switched depending on whether saturated/unsaturated, so the gain is flat at any saturation amount.

FIG. 16 and FIG. 17 are simulation results of the demodulating method of prior art in U.S. Pat. No. 5,867,341, Official Gazette, "Disk drive system using multiple pairs of embedded servo bursts", (absolute position vs. demodulated position characteristics and absolute position vs. gain characteristics), where FIG. 16 is a result when RRO is zero and saturation is 0.4 track, and FIG. 17 is a result when RRO is zero and saturation is 0.3 track. As FIG. 16 and FIG. 17 show, the demodulating characteristics change according to the saturation amount, and gain is flat in the unsaturated area but changes greatly in the saturated area.

FIG. 18 and FIG. 19 are simulation results of the demodulating method of prior art in U.S. Pat. No. 6,369,974, Official Gazette, "Disk drive with method of constructing a continuous position signal and constrained method of linearizing such a position signal while maintaining continuity", (absolute position vs. demodulated position characteristics and absolute position vs. gain characteristics), where FIG. 18 is a result when RRO is zero and saturation is 0.4 track, and FIG. 19 is a result when RRO is zero and saturation is 0.3 track. As FIG. 18 and FIG. 19 show, the demodulated position accuracy decreases, and gain is flat in the saturated area but deviates from 1, and fluctuates greatly in the unsaturated area.

FIG. 20 and FIG. 21 are simulation results of the demodulating method of prior art in Japanese Patent Application Laid-Open No. H9-198817, "Magnetic disk apparatus", (absolute position vs. demodulated position characteristics and absolute position vs. gain characteristics), where FIG. 20 is a result when RRO is zero and saturation is 0.4 track, and FIG. 21 is a result when RRO is zero and saturation is 0.3 track. As FIG. 20 and FIG. 21 show, the gain fluctuation is great in the saturated and unsaturated areas.

As shown here, according to the present invention, the demodulated position is more accurate regardless the saturation amount of PosN and PosQ, and gain is flat, so the present invention contributes to improving head positioning accuracy.

[Parameter Measurement Processing]

Figure 22:
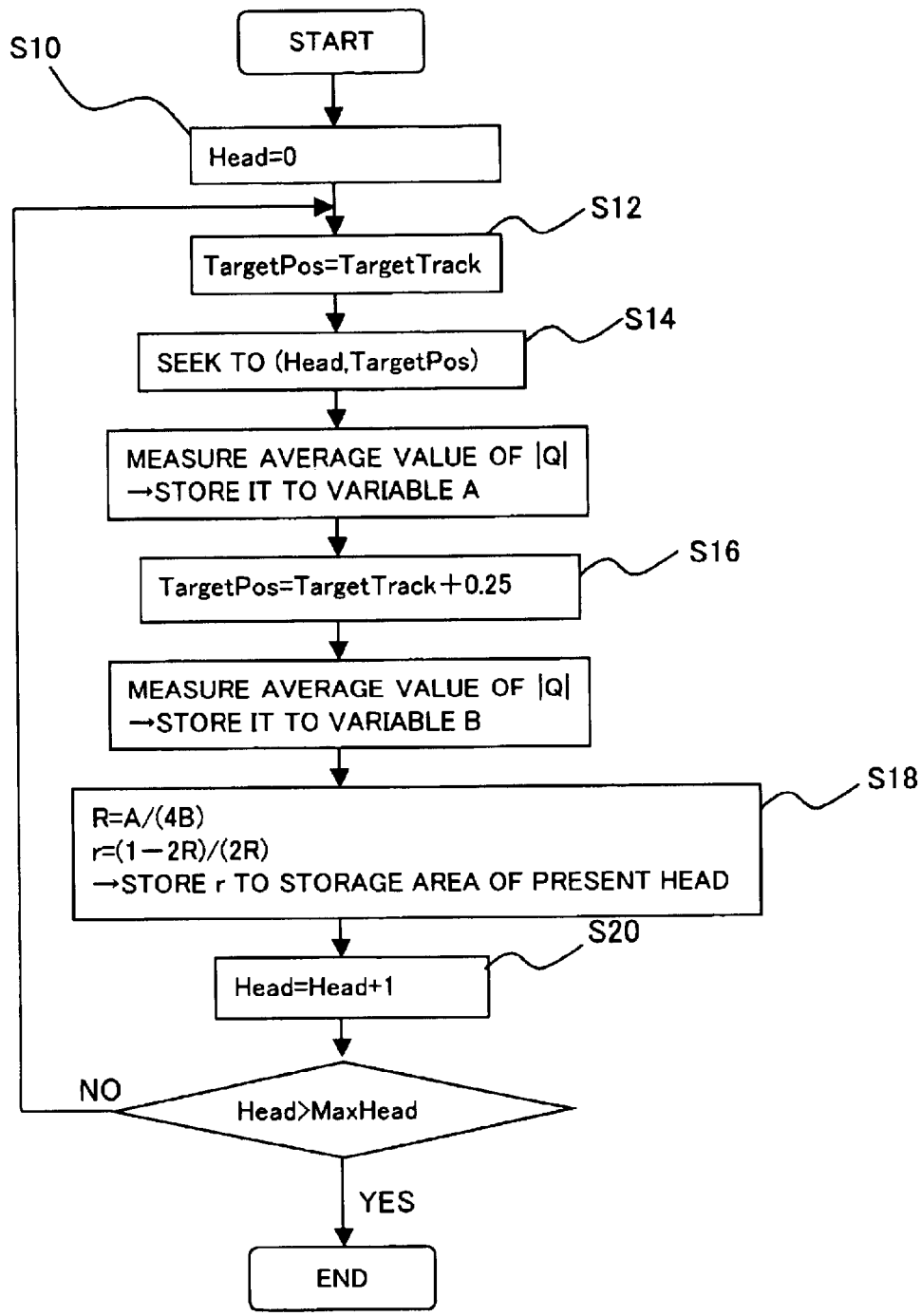
FIG. 22 is a flow chart depicting the measurement processing of the saturation coefficient in FIG. 8.
Figure 23:
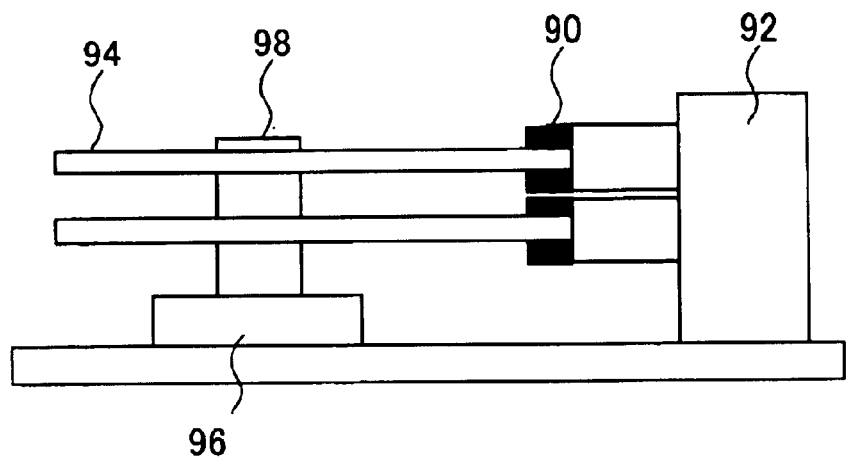
FIG. 23 is a diagram depicting the configuration of a conventional magnetic disk apparatus.
Figure 24:
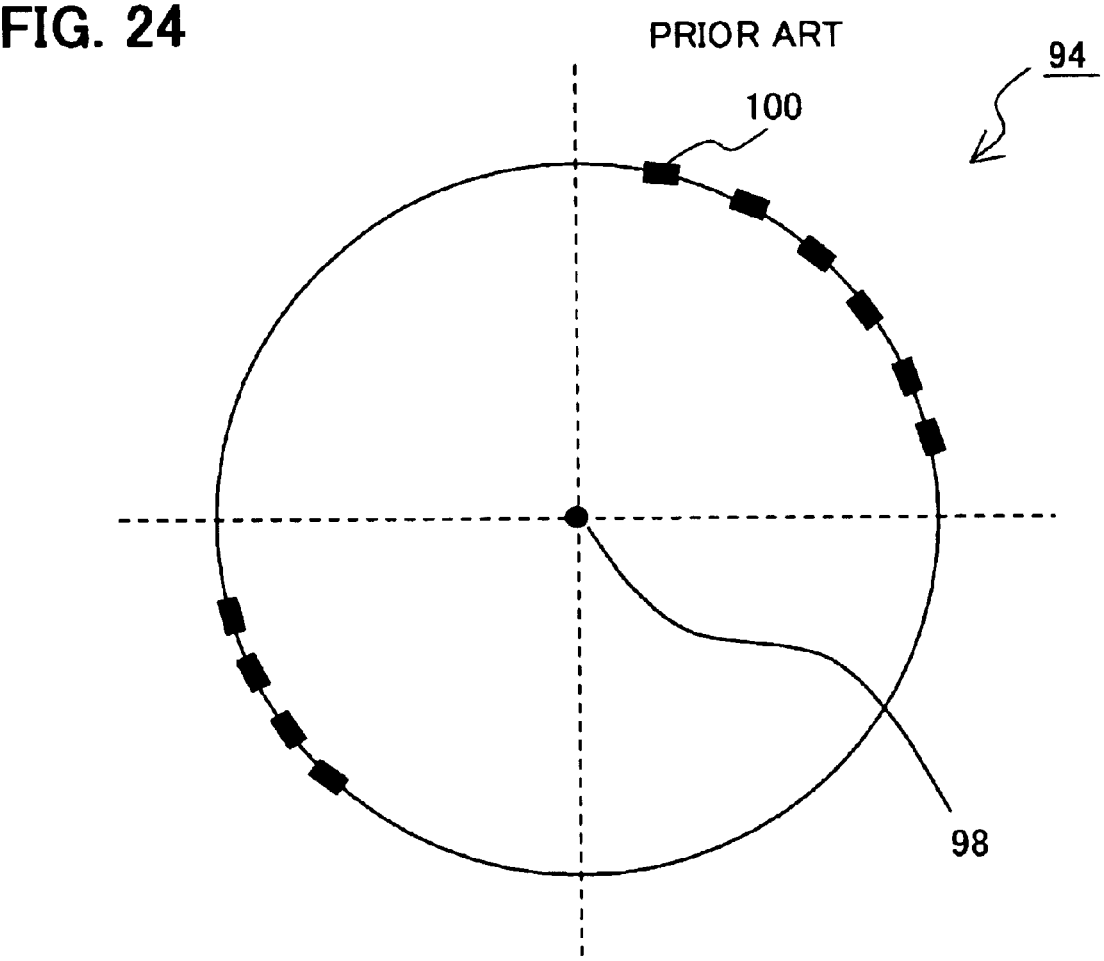
FIG. 24 is a diagram depicting the position signals in FIG. 23.
Figure 25:
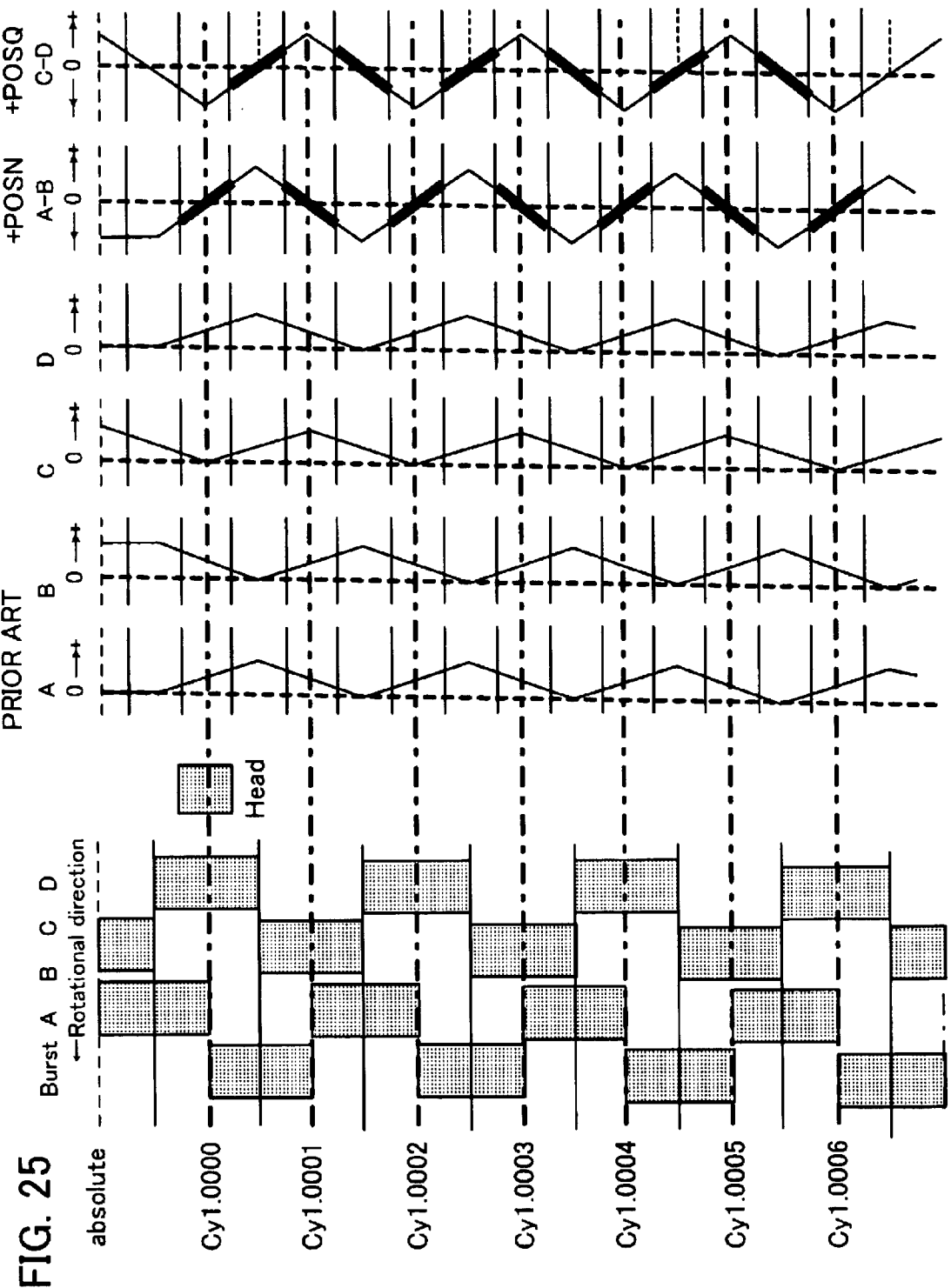
FIG. 25 is a diagram depicting conventional position demodulating processing.
Figure 26:
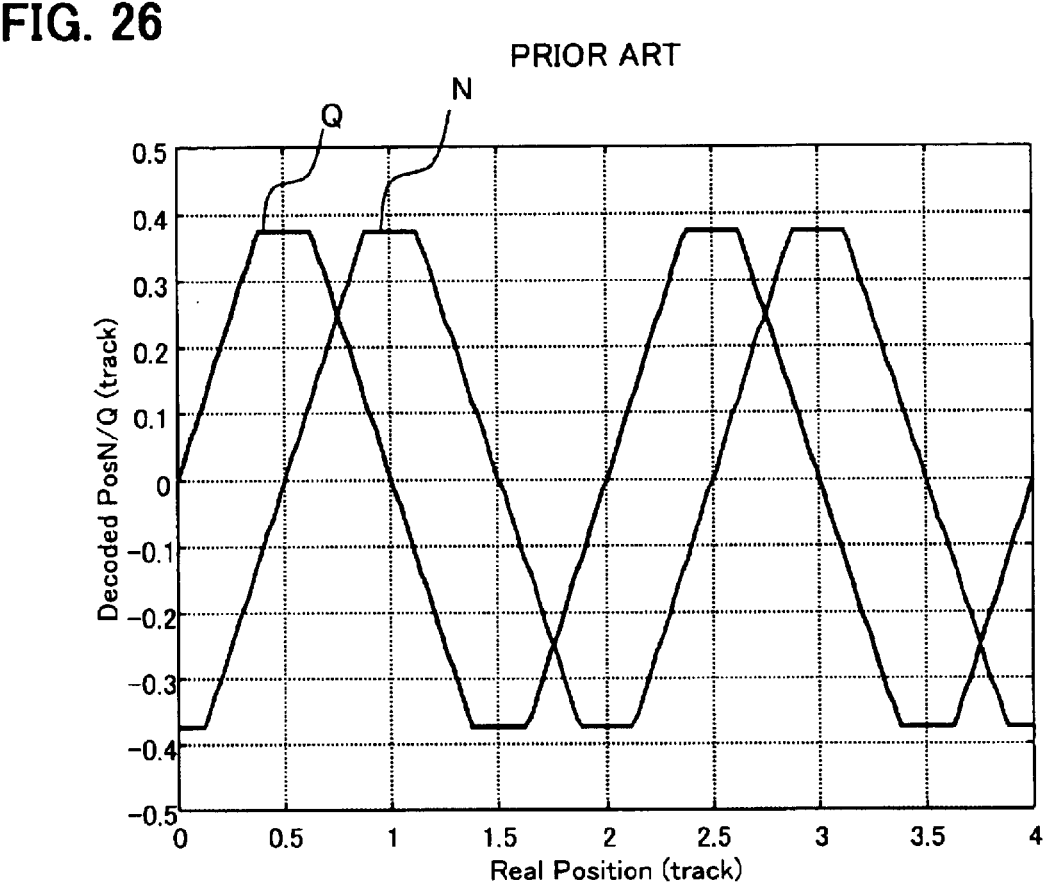
FIG. 26 is a diagram depicting the two-phase servo signal in FIG. 25.
Figure 27:
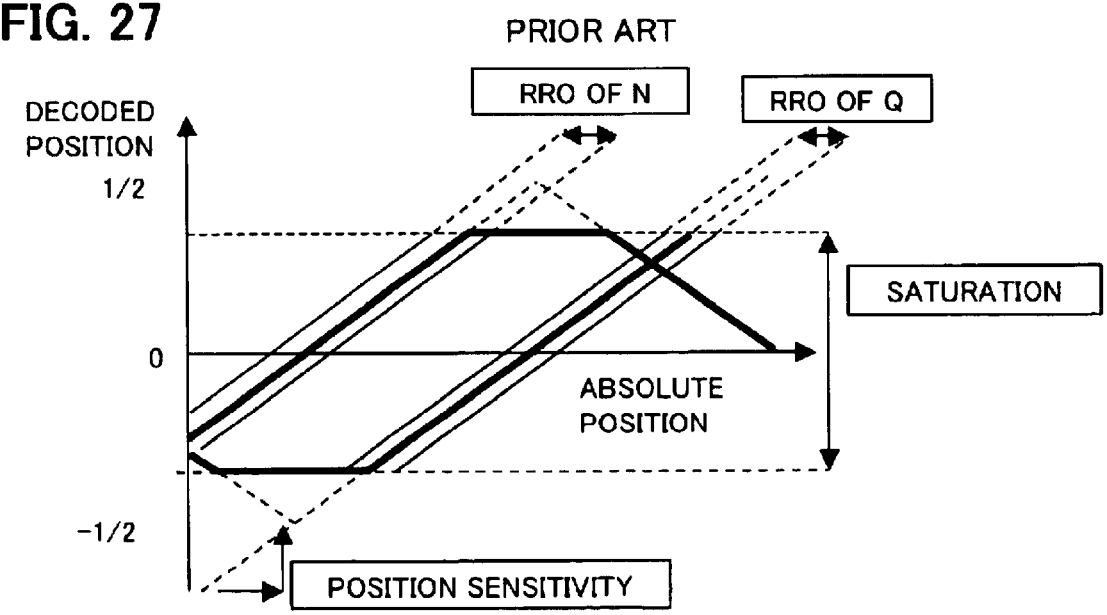
FIG. 27 is a diagram depicting the demodulating error factors in FIG. 25.

The measurement processing of the above mentioned saturation coefficient r will now be described with reference to FIG. 22. This measurement processing is executed on an individual magnetic disk apparatus before shipment of the magnetic disk apparatus from the factory.

(S10) Head number Head is initialized to "0".

(S12) The target position Target Pos is set to the target track Target Track.

(S14) The head of the head number Head seeks to the target position Target Pos. And at this position, the average value of the absolute value |Q| of PosQ is measured from the read output of the head, and is stored to the variable A.

(S16) The target position Target Pos is changed to a target track Target Track+0.25, and the head seeks to the target position Target Pos. And at this position, the average value of the absolute value |Q| of PosQ is measured from the read output of the head, and is stored to the variable B.

(S18) The number of saturated tracks R is calculated by R=A/(4B), and the saturation coefficient r is calculated by r=(1−2R)/(2R). Then the calculated r is stored to the storage area of this head in the table 46 (see FIG. 9).

(S20) The head number Head is incremented by "1". It is judged whether the head number Head exceeds the maximum head number MaxHead. If the head number Head does not exceed the maximum head number MaxHead, processing returns to step S12. If the head number Head exceeds the maximum head number MaxHead, processing ends.

In other words, the saturation amount of the signal is measured in the measurement track with offset "0". Then the value of the signal at the point |N|=|Q| is determined with a ¼ track offset. The saturation coefficient r is determined for each head by these two measured value.

In this flow, there is only one measurement point, but the average value at many points may be determined. Also shown in FIG. 9, the area can be divided into zones, and the saturation coefficient r is determined for each zone. Particularly when a rotary actuator is used for the VCM, the detection characteristics of the read head differs, and the saturation width also differs, depending on the yaw angle of the head, so it is preferable to measure the saturation coefficient r for each zone.

[Other Embodiments]

The present invention was described by embodiments, but the present invention can be modified in various ways within the scope of the essential character of the present invention, which shall not be excluded from the technical scope of the present invention.

For example, in the above embodiments, the demodulating formula N/|Q| is used for the saturated area and the demodulating formula N/(|N|+|Q|) is used for the unsaturated area, but other demodulating formulas can be used. In other words, as FIG. 7 shows, it is assumed that the signals PosN and PosQ have the form of a trapezoidal wave, but depending on the relationship with the head characteristics and the track width, the signals PosN and PosQ could have a more round waveform, closer to a sine wave, and not such a form with angles as a trapezoidal wave.

In such a case, a combination of demodulating formulas for a saturated/unsaturated area, which is different from the above mentioned combination, may be the optimum, since deviation from the absolute position becomes smaller and the gain becomes smaller. These combinations will be described below.

(1) The demodulating formula $N/|Q|$ is used for the saturated area, and the demodulating formula $N/\sqrt{(N^2+Q^2)}$ is used for the unsaturated area. That is,
when $|N|\leq|Q|$ $$\text{if } |N|\leq r|Q| \text{ then } \pm N/(|Q|*2\sqrt{(2(1+r^2))}) \quad (10)$$

$$\text{if } |N|>r|Q| \text{ then } \pm N/\sqrt{(N^2+Q^2)*2\sqrt{2}}) \quad (11)$$

when $|N|>|Q|$ $$\text{if } |Q|\leq r|N| \text{ then } \pm Q/(|N|*2\sqrt{(2(1+r^2))}) \quad (12)$$

$$\text{if } |Q|>r|N| \text{ then } \pm Q/(\sqrt{(N^2+Q^2*2\sqrt{2}})) \quad (13)$$

(2) The demodulating formula $N/\sqrt{+(N^2+Q^2)}$ is used for the saturated area, and the demodulating formula $N/(|N|+|Q|)$ is used for the unsaturated area. That is,
when $|N|\leq|Q|$ $$\text{if } |N|\leq r|Q| \text{ then } \pm N*\sqrt{(1+r^2)}/(\sqrt{(N^2+Q^2)}*2(r+1)) \quad (14)$$

$$\text{if } |N|>r\ |Q| \text{ then } \pm N/((|N|+|Q|)*2) \quad (15)$$

when $|N|>|Q|$ $$\text{if } |Q|\leq r|N| \text{ then } \pm Q*\sqrt{(1+r^2)}/(\sqrt{(N^2+Q^2)}*2(r+1)) \quad (16)$$

$$\text{if } |Q|>r|N| \text{ then } \pm Q/((|N|+|Q|)*2 \quad (17)$$

The disk apparatus was described using a magnetic disk apparatus, but the present invention can be applied to other disk apparatus, such as an optical disk apparatus.

In this way, according to the position demodulating method of the present method, saturated/unsaturated is judged by the ratio of the respective absolute values of PosN and PosQ, a different demodulating method is used for the saturated block and the unsaturated block, and the demodulating formula is constructed such that the edge of each demodulating block matches with the edge of the adjacent demodulating block. Therefore an optimum formula is selected depending on whether the block is saturated/unsaturated, so a more accurate position demodulating is possible compared with a conventional method which does not consider saturation at all.

Also the absolute value of PosN and the absolute value of PosQ are compared, and saturated/unsaturated is judged depending on whether the ratio thereof is greater or smaller than the predetermined saturation coefficient r, so it is unnecessary to measure the position sensitivity in advance, and saturation can be accurately judged even if it is unknown as to how many tracks the detected PosN and PosQ actually correspond to.

What is claimed is:

1. A head position demodulating method for demodulating a position of a head by acquiring two-phase servo signals of PosN and PosQ from servo information recorded on a disk, comprising:

a step of judging a saturated area and an unsaturated area of said PosN or said PosQ from the ratio of the absolute value of said PosN and the absolute value of said PosQ;

a first step of calculating a demodulated position by a first demodulating formula where said PosN and PosQ are combined in said saturated area; and a second step of calculating a demodulated position by another second demodulating formula where said PosN and said PosQ are combined in said unsaturated area.

2. The head position demodulating method according to claim 1, further comprising a step of comparing the absolute value of said PosN and the absolute value of said PosQ, and a step of selecting one of said first and second steps according to said comparison result and said judgment result.

3. The head position demodulating method according to claim 1, wherein said first and second demodulating formulas are constructed so that the demodulated positions by said first demodulating formula and by said second demodulating formula match at a demodulating boundary between said saturated area and said unsaturated area.

4. The head position demodulating method according to claim 1, wherein said judgment step comprises a step of judging as saturated when the ratio of the absolute value of said PosN and the absolute value of said PosQ is a predetermined ratio or less, and judging as unsaturated when said ratio exceeds the predetermined ratio.

5. The head position demodulating method according to claim 4, further comprising a step of selecting said predetermined ratio corresponding to a selected head out of a plurality of heads.

6. The head position demodulating method according to claim 4, wherein said first step comprises a step of demodulating using said first demodulating formula constructed by a combination of said PosN, said PosQ and said ratio.

7. The head position demodulating method according to claim 4, wherein said first step comprises a step of demodulating with said first demodulating formula where a smaller absolute value of the absolute value of said PosN and the absolute value of said PosQ is included in the numerator, and the greater absolute value and said predetermined ratio are included in the denominator, and said second step comprises a step of demodulating with said second demodulating formula where the smaller absolute value of the absolute value of said PosN and the absolute value of said PosQ is included in the numerator, and the greater absolute value is included in the denominator.

8. The head position demodulating method according to claim 7, wherein the first demodulating formula of said first step is comprised of:

a demodulating formula where said PosN is included in the numerator, and the absolute value of said PosQ and double of said predetermined ratio+1 are included in the denominator when the absolute value of said PosN is the absolute value of said PosQ or less; and a demodulating formula where said PosQ is included in the numerator and the absolute value of said PosN and double of said predetermined ratio+1 are included in the denominator when the absolute value of said PosN exceeds the absolute value of said PosQ.

9. The head position demodulating method according to claim 7, wherein the second demodulating formula of said second step is comprised of:

a demodulating formula where said PosN is included in the numerator, and double of the result of adding the absolute value of said PosN and the absolute value of said PosQ is included in the denominator when the absolute value of said PosN is the absolute value of said PosQ or less; and a demodulating formula where said PosQ is included in the numerator and double of the result of adding the absolute value of said PosN and the absolute value of said PosQ is included in the denominator when the absolute value of said PosN exceeds the absolute value of said PosQ.

10. The head position demodulating method according to claim 4, further comprising a step of measuring said predetermined ratio from the value of PosQ when said head is positioned at a predetermined track position and the value of PosQ when said head is positioned at a position which is ¼ track away from said track position.

11. A disk apparatus comprising:
a head for reading information from a disk on which servo information is recorded;
an actuator for positioning said head to a predetermined position on said disk; and
a control unit for acquiring two-phase servo signals of PosN and PosQ from the servo information read by said head, demodulating the position of the head and controlling said actuator,
wherein said control unit judges a saturated area and an unsaturated area of said PosN or PosQ from the ratio of the absolute value of said PosN and the absolute value of said PosQ, calculates a demodulated position by a first demodulating formula where said PosN and PosQ are combined in said saturated area, and calculates a demodulated position by an another second demodulating formula where said PosN and PosQ are combined in said unsaturated area.

12. The disk apparatus according to claim 11, wherein said control unit compares the absolute value of said PosN and the absolute value of said PosQ, and selects one of said first and second demodulating formulas according to said comparison result and said judgment result of the area.

13. The disk apparatus according to claim 11, wherein said first and second demodulating formulas are constructed so that the demodulated positions by said first demodulating formula and by said second demodulating formula match at a demodulating boundary between said saturated area and said unsaturated area.

14. The disk apparatus according to claim 11, wherein said control unit judges as saturated when the ratio of the absolute value of said PosN and the absolute value of said PosQ is a predetermined ratio or less, and judges as unsaturated when said ratio exceeds the predetermined ratio.

15. The disk apparatus according to claim 14, wherein said control unit selects said predetermined ratio corresponding to a selected head out of a plurality of heads.

16. The disk apparatus according to claim 14, wherein said control unit demodulates using said first demodulating formula constructed by a combination of said PosN, PosQ and said ratio.

17. The disk apparatus according to claim 14, wherein said control unit demodulates with said first demodulating formula where the smaller absolute value of the absolute value of said PosN and the absolute value of said PosQ is included in the numerator, and the greater absolute value and said predetermined ratio are included in the denominator, and demodulates with said second demodulating formula where the smaller absolute value of the absolute value of said PosN and the absolute value of said PosQ is included in the numerator, and the greater absolute value is included in the denominator.

18. The disk apparatus according to claim 17, wherein the first demodulating formula of said control unit is comprised of:
a demodulating formula where said PosN is included in the numerator, and the absolute value of said PosQ and double of said predetermined ratio+1 are included in the denominator when the absolute value of said PosN is the absolute value of said PosQ or less; and
a demodulating formula where said PosQ is included in the numerator, and the absolute value of said PosN and double of said predetermined ratio+1 are included in the denominator when the absolute value of said PosN exceeds the absolute value of said PosQ.

19. The disk apparatus according to claim 17, wherein said second demodulating formula of said control section is comprised of:
a demodulating formula where said PosN is included in the numerator, and double of the result of adding the absolute value of said PosN and the absolute value of said PosQ is included in the denominator when the absolute value of said PosN is the absolute value of said PosQ or less; and
a demodulating formula where said PosQ is included in the numerator, and double of the result of adding the absolute value of said PosN and the absolute value of said PosQ is included in the denominator when the absolute value of said PosN exceeds the absolute value of said PosQ.

20. The disk apparatus according to claim 14, wherein said control unit measures said predetermined ratio from the value of PosQ when said head is positioned at a predetermined track position and the value of PosQ when said head is positioned at a position which is ¼ track away from said track position.

* * * * *